US011100188B2

United States Patent
Borisov et al.

(10) Patent No.: US 11,100,188 B2
(45) Date of Patent: Aug. 24, 2021

(54) METHOD OF AND SYSTEM FOR SELECTIVELY PRESENTING A RECOMMENDATION BLOCK IN BROWSER APPLICATION

(71) Applicant: YANDEX EUROPE AG, Lucerne (CH)

(72) Inventors: Maksim Olegovich Borisov, Orel (RU); Aleksey Vladimirovich Golikov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 206 days.

(21) Appl. No.: 16/531,980

(22) Filed: Aug. 5, 2019

(65) Prior Publication Data
US 2020/0192966 A1 Jun. 18, 2020

(30) Foreign Application Priority Data
Dec. 13, 2018 (RU) .......................... RU2018144181

(51) Int. Cl.
*G06F 16/957* (2019.01)
*G06F 3/0488* (2013.01)
(Continued)

(52) U.S. Cl.
CPC ........ *G06F 16/9577* (2019.01); *G06F 3/0482* (2013.01); *G06F 3/0488* (2013.01);
(Continued)

(58) Field of Classification Search
CPC ............... G06F 16/9577; G06F 3/0488; G06F 16/9535; G06F 16/24578; G06F 3/0482;
(Continued)

(56) References Cited

U.S. PATENT DOCUMENTS 7,827,172 B2 11/2010 Zaragoza et al.
8,200,661 B1 6/2012 Pearce et al.
(Continued)

OTHER PUBLICATIONS

Fernandez-Luna et al., "User intent transition for explicit collaborative search through groups recommendation", Oct. 28, 2011; 10.1145/2064075.2064083 ISBN: 978-1-4503-0951-6.
(Continued)

*Primary Examiner* — Pei Yong Weng
(74) *Attorney, Agent, or Firm* — BCF LLP

(57) ABSTRACT

A method of selectively presenting a recommendation block to a user accessing a web resource in a browser application is disclosed. The method is executable at a server and includes receiving an indication of a browser application state and an indication of a user action with the browser application, determining features associated with at least a part of the web resource, receiving an indication of supplemental content at least in part based on the plurality of features, and executing a Machine Learning Algorithm (MLA) to determine a recommendation score based on at least the browser application state. Based on the recommendation score, the server selectively sends to the browser application at least one data packet configured to cause the browser application to display the recommendation block containing the supplemental content on the display of the electronic device.

19 Claims, 9 Drawing Sheets

(51) Int. Cl.
*H04L 29/08* (2006.01)
*G06N 20/00* (2019.01)
*G06F 16/9535* (2019.01)
*G06F 16/2457* (2019.01)
*G06N 5/04* (2006.01)
*G06F 3/0482* (2013.01)

(52) U.S. Cl.
CPC .... *G06F 16/24578* (2019.01); *G06F 16/9535* (2019.01); *G06N 5/048* (2013.01); *G06N 20/00* (2019.01); *H04L 67/02* (2013.01)

(58) Field of Classification Search
CPC .. G06F 3/0486; G06F 3/04883; G06F 16/907; G06F 16/908; H04L 67/02; H04L 67/22; G06N 20/00; G06N 5/048; G06N 3/02
See application file for complete search history.

(56) References Cited

U.S. PATENT DOCUMENTS

| | | |
|---|---|---|
| 9,223,830 B1 | 12/2015 | Dzik |
| 2007/0061336 A1 | 3/2007 | Ramer et al. |
| 2007/0100915 A1 | 5/2007 | Rose et al. |
| 2008/0250026 A1 | 10/2008 | Linden et al. |
| 2009/0172021 A1 | 7/2009 | Kane et al. |
| 2011/0161479 A1 | 6/2011 | Freishtat et al. |
| 2012/0078954 A1 | 3/2012 | Araya et al. |
| 2014/0019285 A1 | 1/2014 | Karthik et al. |
| 2015/0026001 A1 | 1/2015 | Gu et al. |
| 2015/0066643 A1* | 3/2015 | Choi .................. G06Q 30/0255 705/14.53 |
| 2015/0278358 A1 | 10/2015 | Abib et al. |
| 2015/0310529 A1 | 10/2015 | Ronen et al. |
| 2017/0098144 A1 | 4/2017 | Gupta et al. |
| 2017/0272303 A1 | 9/2017 | Ke et al. |
| 2017/0329490 A1 | 11/2017 | Esinovskaya et al. |
| 2017/0344531 A1 | 11/2017 | Neumann |
| 2018/0060749 A1* | 3/2018 | Yan .................... G06Q 30/0201 |
| 2018/0075137 A1 | 3/2018 | Lifar et al. |
| 2019/0311301 A1 | 10/2019 | Pyati |

OTHER PUBLICATIONS

Notice of Allowance dated May 20, 2021 received in respect of a related U.S. Appl. No. 16/534,504.

* cited by examiner

METHOD OF AND SYSTEM FOR SELECTIVELY PRESENTING A RECOMMENDATION BLOCK IN BROWSER APPLICATION

CROSS-REFERENCE

The present application claims priority to Russian Patent Application No. 2018144181, entitled "Method of and System for Selectively Presenting a Recommendation Block in Browser Application", filed Dec. 13, 2018, the entirety of which is incorporated herein by reference.

FIELD OF TECHNOLOGY

The present technology relates to web browsers, and more specifically to methods and systems for selectively presenting content recommendation blocks in a browser application of an electronic device.

BACKGROUND

Numerous content generation and/or recommendation methods and systems exist. Such methods and systems provide users viewing various web resources via electronic devices with content that could be of interest.

For example, US 2018/0060749 A1, published on Mar. 1, 2018 and assigned to LinkedIn Corporation, teaches a system and method for content generation and targeting using machine learning. In example embodiments, a probability that a user will visit a webpage based on historical data is calculated. A probability that the user will engage with a particular content category based on past user engagement is calculated. In response to the probability of the user engaging with the particular content category being equal to or greater than a first threshold, the content is generated. Further, in response to the probability of the user not visiting a webpage meeting or exceeding a second threshold, the generated content is sent to the user.

As another example, U.S. Pat. No. 9,223,830 BI, issued on Dec. 29, 2015 and assigned to Audible Inc., teaches a presentation analysis service that may obtain presentation information from one or more computing devices that are presenting an item of content. The presentation information may be used to generate recommendations to be provided to a user that is consuming the item of content and/or to a provider of items of content. Further, the presentation information may be used to adapt a presentation of the item of content.

As another example, US 2014/019285 A1, published on Jan. 16, 2014 and assigned to eBay Inc., teaches methods and systems for attempting to optimize online listings for users of an Internet sales website, such as an online auction website. Recommendations can be provided to the users for improving their listings. The recommendations can be made using rules and statistical models. The listings can be monitored for compliance with the recommendations. The listings can be monitored for effectiveness of such compliance. The rules can be modified in light of such effectiveness. In this manner, listings can tend to be optimized so as to increase the likelihood of a visit from a potential buyer resulting in conversion.

As another example, U.S. Pat. No. 8,200,661 BI, issued on Jan. 12, 2012 and assigned to Google Inc., teaches a method, and a computer-program product (e.g., software) for use with a computer system which may be used to provide one or more recommendations to a user based at least in part on monitored user actions while the user interacts with a support document (e.g., a website or a web page) that includes content for multiple support topics, such as help instructions associated with an application or a service. In particular, one or more support topics are associated with the monitored user actions using a supervised-learning model, and these support topics are recommended to the user. This supervised-learning model may be trained on portions of the content accessed by multiple users during multiple sessions. In the supervised-learning model, content accessed by one of the users during a given session may be more relevant than content accessed by this user during the multiple sessions.

As another example, US 2007/0100915 A1, published on May 3, 2007 and assigned to Oath Inc., teaches that dynamically suggested information helps users navigate collections of information and the underlying reference items in the collections with a reduced need to perform search queries. For example, a user browsing an Internet sports site might be shown dynamically generated links to fantasy sports websites, sports and team message boards, and other sports-related sites. Clicking on a dynamically generated link, such as a fantasy sports website link, redirects the user to a new site. When the user arrives at the new site, the dynamically generated links and any other suggested information are automatically updated.

SUMMARY

Without wishing to be bound to any specific theory, developers of the present technology have appreciated that in at least some cases, prior art methods and systems for generating and/or recommending content have shortcomings.

The present technology has been developed based on developers' appreciation that there exists at least one problem associated with each given prior art method and system for generating and/or recommending content. For example, in some cases prior art systems present content to users at inappropriate times (from the user's perspective), potentially resulting in the user being dissatisfied with the content recommendation service/underlying application, but also waste bandwidth to send the recommended content between a server and a client device. In some cases, prior art systems present content to users that is of no interest to the users. In some other cases, prior art systems present content to users in a visual format that is suboptimal given the particular content and/or type(s) of content presented and/or user's then current browsing intent.

For example, in some cases, prior art technology may display supplemental content, which has relatively little value to a given user, in a relatively large window on a user's electronic device. As a result, the user may be required to close the relatively large window in order to carry on with their browsing activity, thereby losing time that they could otherwise have used to achieve whatever ends they were intent on achieving via their browsing activity. At least in cases where prior art systems and methods may display such nuisance windows relatively frequently, the user may experience a material cumulative time loss and/or a material loss of productivity.

The present technology has been developed with a view to ameliorating at least one of, and in some implementations, different combinations of, such problems with the prior art.

A first broad aspect of the present technology relates to determining when to display, and when not to display, supplemental content to a user at various times during the user's browsing activity. In some cases, the present technology allows to present supplemental content (which is an example of supplemental content) to a user at relevant times and/or when the supplemental content will be of interest to the user. In some cases, the present technology allows to avoid presenting a user with supplemental content that would be of no interest to the user and/or at inappropriate times. In some cases, the present technology allows to reduce a frequency of instances when a user is presented with supplemental content that is of no interest to the user.

A second broad aspect of the present technology relates to determining a particular visual format and/or a particular visual method of presentation of supplemental content to a user, after it is determined that supplemental content should be displayed to the user. In some non-limiting implementations, the present technology allows to determine whether a particular set of supplemental content should be presented in a large window, a medium sized window, a small window, as a snippet, as an animated window, with what type of animation, in which part(s) of the display, and so on, depending on the particular type of the supplemental content and/or on the particular content for example.

In some cases, the present technology allows relatively more interesting content to be presented to the user in a relatively larger format (e.g. via a relatively larger window) and/or in an otherwise more prominent manner on a display 103 of the electronic device 102 (see FIG. 1). In some cases, the present technology allows relatively less interesting content to be presented to the user in a relatively smaller format (e.g. via a relatively smaller window) on the screen of the electronic device. In some cases, the present technology allows relatively more interesting content to be presented to the user in a relatively larger format (e.g. via a relatively larger window) on the screen of the electronic device.

In some cases, the present technology allows presenting, for example, video content in a window optimized for displaying video, while presenting, for example, textual content in a window optimized for displaying text. In some cases, the present technology allows display content that was determined to be recommended to the user but having a relatively low probability of being of interest to the user, in a snippet that does not impede by its presence the user's ability to continue browsing a web resource. In some such cases, the user is able to continue browsing the resource without having to close the snippet for example.

In some cases, displaying supplemental content via a particular visual presentation selected based on a user action and/or a particular current state of a graphical user interface being used by the user and/or the particular type of content and/or particular relevance of content is more beneficial to the user than displaying the same supplemental content via a different visual presentation.

In view of the above, in a first broad aspect of the present technology, there is provided a method of selectively presenting a recommendation block to a user accessing a web resource in a browser application being displayed on a display of an electronic device, the method executable at a server connectable to the electronic device via a communication network, the method comprising: receiving, at a server, an indication of a browser application state of the browser application, the indication including: a display state of the web resource being displayed in the browser application, the display state being one of a plurality pre-defined display states, and an indication of a user action with the browser application; determining, by the server, a plurality of features associated with at least a part of the web resource.

The method proceeds with receiving, by the server, from a content recommendation server an indication of supplemental content, the supplemental content being selected at least in part based on the plurality of features; executing, by the server, a Machine Learning Algorithm (MLA) to determine a recommendation score, the recommendation score being indicative of whether the supplemental content should be displayed via the browser application, the determination being done based on at least the browser application state; and based on the recommendation score, selectively executing sending by the server to the browser application at least one data packet configured to cause the browser application to display the recommendation block containing the supplemental content on the display of the electronic device.

In some embodiments, the plurality of features includes data representative of a plurality of prior user actions by which the user had interacted with the web resource via the browser application, at least some of the plurality of prior user actions having caused recommendation blocks to be displayed via the browser application.

In some embodiments, the plurality of features includes a plurality of features of the web resource.

In some embodiments, the recommendation score includes a confidence level parameter determined by the MLA based on the plurality of features, the confidence level parameter being indicative of a probability that the supplemental content would be of interest to the user if presented to the user; and the selectively executing the sending the at least one data packet to the browser application includes determining, by the server, whether the probability exceeds a pre-defined probability threshold, and sending the at least one data packet to the browser application if the probability exceeds the pre-defined probability threshold.

In some embodiments, the MLA had been trained based on user interactions with training recommendation blocks and based on features associated with training web resources that were accessed by users to be presented with respective ones of the training recommendation blocks.

In some embodiments, the user action is at least any one of: a back scroll, a scrolling action, a gesture inputted into a touch sensitive input device, an actuation of at least one key of a keyboard, and an actuation of at least one button of a mouse, a scrolling action reaching an end of a displayed page of the web resource.

In some embodiments, the display state is further indicative of the recommendation block being in a current state at the time of the server receiving the indication of the user action, the current state being indicative of how the recommendation block having previous content is being displayed together with the web resource; and the method further includes sending to the browser application a presentation selection algorithm configured to be processed by the browser application in response to receiving the at least one data packet, by: the browser application inputting into the presentation selection algorithm as input both (i) the indication of the user action and (ii) an indication of the current state of the recommendation block, the browser application receiving from the presentation selection algorithm as output based on the indication of the user action and the indication of the current state, an indication of a next state of the recommendation block, and the browser application displaying the recommendation block containing the supplemental content on the display in the next state of the recommendation block.

In some embodiments, the presentation selection algorithm is a lookup table that comprises a plurality of different possible next states of the recommendation block as possible outputs, and the user action and a plurality of different possible current states of the recommendation block as possible inputs for providing the possible outputs; the lookup table correlates each of the plurality of different next states of the recommendation block to one particular combination of a given current state of the plurality of different possible current states and the user action; and the lookup table is configured to output the next state of the recommendation block from the plurality of different possible next states of the recommendation block as output in response to the current state of the recommendation block and the user action being inputted into the lookup table as input.

In some embodiments, the lookup table comprises a plurality of different possible user actions as part of the possible inputs, the user action being one of the different possible user actions; and the lookup table correlates each particular combination of: i) the given current state of the plurality of different possible current states of the recommendation block, and ii) a given user action of the plurality of different possible user actions to one next state of the plurality of different next states of the recommendation block.

In some embodiments, the recommendation score includes a confidence level parameter indicating a confidence level that the supplemental content would be of interest to the user if presented to the user; the sending to the browser application the lookup table includes selecting, by the server, the lookup table out of a plurality of different lookup tables accessible by the server, In some such embodiments, each lookup table of the plurality of different lookup tables: corresponds to one confidence level range of a plurality of different confidence level ranges accessible by the server, and determines a particular next state of the recommendation block based on a given combination of the current state of the recommendation block and the user action, the particular next state of the recommendation block being different from the next state of the recommendation block determined by at least one of the rest of the plurality of different lookup tables based on the same given combination of the current state of the recommendation block and the user action.

In some such embodiments, selecting, by the server, the lookup table out of the plurality of different lookup tables includes: determining a correspondence between the confidence level indicated by the confidence level parameter and a matching one of the plurality of different confidence level ranges, and selecting the lookup table to be the one of the plurality of different lookup tables that corresponds to the matching one of the plurality of different confidence level ranges.

In some embodiments, the supplemental content is associated with at least one type of content; and the lookup table is selected by the server out of the plurality of different lookup tables further based on the at least one type of content.

In some embodiments, the plurality of different lookup tables are sent to the browser application prior to the server sending the at least one data packet to the browser application; and the at least one data packet is configured to cause the browser to process the lookup table to determine the next state of the recommendation block based on the indication of the user action and the indication of the current state and to display the recommendation block on the display in the next state of the recommendation block.

In some embodiments, the sending the at least one data packet includes sending by the server the selected lookup table to the browser application.

In some embodiments, each lookup table of the plurality of lookup tables comprises a plurality of different possible user actions, the user action being one of the different possible user actions; and each lookup table of the plurality of lookup tables correlates each particular combination of: i) the given current state of the plurality of different possible current states of the recommendation block, and ii) a given user action of the plurality of different possible user actions, to one next state of the plurality of different next states of the recommendation block.

In some embodiments, each confidence level of the plurality of different confidence level ranges is a range of confidence levels that the supplemental content would be of interest to the user.

In some embodiments, the plurality of different lookup tables includes: a first lookup table corresponding to a first confidence level of the plurality of different confidence level ranges, and a second lookup table corresponding to a second confidence level of the plurality of different confidence level ranges, the second confidence level being higher than the first confidence level; and the recommendation block is more prominent: when displayed on the display in the particular next state of the recommendation block determined by the second lookup table based on the given combination of the current state of the recommendation block and the user action, when compared to being displayed on the display in the particular next state of the recommendation block determined by the first lookup table based on the same given combination of the current state of the recommendation block and the user action.

In some embodiments, the plurality of different possible current states of the recommendation block comprises a visual state of the recommendation block and a virtual state of the recommendation block, the virtual state being defined such that the recommendation block is invisible on the display when displayed by the browser application in any virtual state of the at least one virtual state.

In some embodiments, the sending by the server to the browser application the at least one data packet, receiving at the server an indication of the user having viewed the supplemental content via the recommendation block; and in response to the receiving the indication of the user having viewed the supplemental content, assigning a given virtual state to the recommendation block as the current state of the recommendation block; and wherein the plurality of different possible current states of each lookup table of the plurality of different lookup tables includes the given virtual state of the recommendation block.

In some embodiments, the plurality of different possible next states of the recommendation block comprises at least one visual state of the recommendation block and at least one virtual state of the recommendation block.

According to another aspect of the present technology, there is provided a server for selectively presenting a recommendation block to a user accessing a web resource in a browser application being displayed on a display of an electronic device, the server being communicatively connectable to the electronic device and comprising: a processor; and a non-transient memory communicatively connected to the processor, the non-transient memory storing instructions.

When executed by the processor, the instructions cause the server to: receive an indication of a browser application state of the browser application, the indication including: a display state of the web resource being displayed in the browser application, the display state being one of a plurality pre-defined display states, and an indication of a user action with the browser application; determine a plurality of features associated with at least the part of the web resource; receive from a content recommendation server an indication of supplemental content; and execute a Machine Learning Algorithm (MLA) to determine a recommendation score, the recommendation score being indicative of whether the supplemental content should be displayed via the browser application, the determination being done based on at least the browser application state.

The instructions further cause the server, where the recommendation score exceeds a pre-defined metric, send to the browser application at least one data packet configured to cause the browser application to display the recommendation block containing the supplemental content on the display in response to the user action.

According to yet another aspect of the present technology, there is also provided another method of determining a next state for a recommendation to be displayed by a browser application on a display of an electronic device, the recommendation block being in a current state, the browser application displaying a web resource on the display.

In some non-limiting embodiments, the method comprises: receiving, at a server, an indication of the web resource and an indication of supplemental content is to be displayed on the display via the recommendation block in association with the web resource; determining, by the server, a plurality of features associated with at least the part of the web resource; executing, by the server, a Machine Learning Algorithm (MLA) based on the plurality of features to determine a confidence level parameter, the confidence level parameter being indicative of a confidence level that the supplemental content will be of interest to the user; and selecting, by the server based on the confidence level parameter, a lookup table out of a plurality of different lookup tables accessible by the server.

In some such method embodiments, each lookup table of the plurality of different lookup tables: corresponds to one confidence level range of a plurality of different confidence level ranges accessible by the server, comprises a plurality of different possible next states of the recommendation block as possible outputs, and a plurality of different possible user actions and a plurality of different possible current states of the recommendation block as possible inputs for generating an output, and correlates each particular combination of a given current state of the plurality of different possible current states and a given user action of the plurality of different possible user actions to one next state of the plurality of different next states.

In some such method embodiments, the method further includes sending, by the server, to the browser application the selected lookup table, the lookup table being configured to be processed by the browser application to: determine an indication of a next state of the recommendation block of the plurality of different possible next states of the recommendation block, and display the recommendation block containing the supplemental content on the display in the next state outputted by the selected lookup table.

In some such method embodiments, the plurality of features includes data representative of a plurality of prior user actions by which the user had interacted with the web resource via the browser application, at least some of the plurality of prior user actions having caused recommendation blocks to be displayed via the browser application.

In some such method embodiments, the plurality of features includes a plurality of features of the web resource.

In some such method embodiments, the MLA had been trained based on user interactions with training recommendation blocks and based on features associated with training web resources that were accessed by users to be presented with respective ones of the training recommendation blocks.

In some such method embodiments, the sending, by the server, to the browser application the selected lookup table is in response to the server receiving an indication of a user action executed in the browser application; and the selected lookup table is configured to be processed by the browser application to determine the indication of the next state of the recommendation block by the browser application inputting into the selected lookup table the indication of the user action and the current state of the recommendation block.

In some such method embodiments, the user action is at least any one of: a back scroll, a scrolling action, a gesture inputted into a touch sensitive input device, an actuation of at least one key of a keyboard, and an actuation of at least one button of a mouse, a scrolling action reaching an end of a displayed page of the web resource.

In some such method embodiments, the plurality of different lookup tables includes: a first lookup table corresponding to a first confidence level of the plurality of different confidence level ranges, and a second lookup table corresponding to a second confidence level of the plurality of different confidence level ranges, the second confidence level being higher than the first confidence level; and the recommendation block is more prominent: when displayed on the display in the particular next state of the recommendation block determined by the second lookup table based on a given combination of the current state of the recommendation block and the user action, when compared to being displayed on the display in the particular next state of the recommendation block determined by the first lookup table based on the same given combination of the current state of the recommendation block and the user action.

In some such method embodiments, the current state of the recommendation block is one of a visual state and a virtual state, the recommendation block being invisible on the display when the recommendation block is in the virtual state.

In some such method embodiments, the plurality of different possible current states of the recommendation block comprises a visual state of the recommendation block and a virtual state of the recommendation block, the virtual state being defined such that the recommendation block is invisible on the display when displayed by the browser application in any virtual state of the at least one virtual state In some such method embodiments, the method further comprises: after the sending by the server to the browser application the selected lookup table, receiving at the server an indication of the user having viewed the supplemental content via the recommendation block displayed by the browser application using the selected lookup table; and in response to the receiving the indication of the user having viewed the supplemental content, changing the current state of the recommendation block to a given virtual state of the recommendation block, the plurality of different possible current states of each lookup table of the plurality of different lookup tables including the given virtual state of the recommendation block.

In some such method embodiments, the plurality of different possible next states of the recommendation block comprises at least one visual state of the recommendation block and at least one virtual state of the recommendation block.

In some such method embodiments, the confidence level indicated by the determined confidence level parameter is a probability that the supplemental content will be of interest to the user; and the selecting the lookup table out of the plurality of different lookup tables is in executed by the server in response to determining, by the server, that the probability indicated by the determined confidence level parameter exceeds a pre-defined probability threshold.

In yet another aspect, the present technology provides a server for causing a browser application of an electronic device to display on a display of the electronic device a recommendation block in a next state of the recommendation block, the recommendation block being in a current state prior to being displayed on the display in the next state, the browser application displaying a web resource on the display.

In some embodiments, the server is communicatively connectable to the electronic device and comprises: a processor; and a non-transient memory communicatively connected to the processor, the non-transient memory storing instructions that when executed by the processor, cause the server to: receive an indication of the web resource and an indication of supplemental content to be displayed on the display via the recommendation block in association with the web resource; receive an indication of a plurality of features associated with at least the part of the web resource; execute a Machine Learning Algorithm (MLA) based on the plurality of features to determine a confidence level parameter, the confidence level parameter being indicative of a confidence level that the supplemental content will be of interest to the user; select, based on the confidence level parameter, a lookup table to be sent to the electronic device.

In some such embodiments, the lookup table is one of a plurality of different lookup tables accessible by the server, each lookup table of the plurality of different lookup tables: corresponding to one confidence level range of a plurality of different confidence level ranges accessible by the server, comprising a plurality of different possible user actions and a plurality of different possible current states of the recommendation block as possible inputs for generating an output, and a plurality of different possible next states of the recommendation block as possible outputs based on the possible inputs, and correlating each particular combination of a given current state of the plurality of different possible current states and a given user action of the plurality of different possible user actions to one next state of the plurality of different next states.

In some such embodiments, the instructions in the non-transient memory when executed by the processor further cause the server to send to the browser application the selected lookup table, the selected lookup table being configured to be processed by the browser application to: determine an indication of the next state of the recommendation block of the plurality of different possible next states of the recommendation block, and display the recommendation block containing the supplemental content on the display in the next state of the recommendation block outputted by the selected lookup table.

In some such server embodiments, the selected lookup table is configured to be processed by the browser application by the browser application: inputting into the selected lookup table a combination of: (i) an indication of a user action executed in the browser application while the recommendation block is in the current state, and (ii) the current state of the recommendation block; and receiving from the selected lookup table the next state of the recommendation block as output in response to the inputting.

In some such server embodiments, the user action is at least any one of: a back scroll, a scrolling action, a gesture inputted into a touch sensitive input device, an actuation of at least one key of a keyboard, and an actuation of at least one button of a mouse, a scrolling action reaching an end of a displayed page of the web resource.

In some such server embodiments, the plurality of features includes data representative of a plurality of prior user actions by which the user had interacted with the web resource via the browser application, at least some of the plurality of prior user actions having caused recommendation blocks to be displayed via the browser application.

In some such server embodiments, the plurality of features includes a plurality of features of the web resource.

In some such server embodiments, the MLA had been trained based on user interactions with training recommendation blocks and based on features associated with training web resources that were accessed by users to be presented with respective ones of the training recommendation blocks.

In some such server embodiments, the instructions that when executed by the processor, cause the server to: i) receive the indication of the web resource, ii) receive an indication of the plurality of features, iii) execute the MLA, and iv) select and send the lookup table, in response to the server having received the indication of the user action executed in the browser application.

BRIEF DESCRIPTION OF THE DRAWINGS

These and other features, aspects and advantages of the present technology will become better understood with regard to the following description, appended claims and accompanying drawings where:

DETAILED DESCRIPTION OF NON-LIMITING EMBODIMENTS

Figure 1:
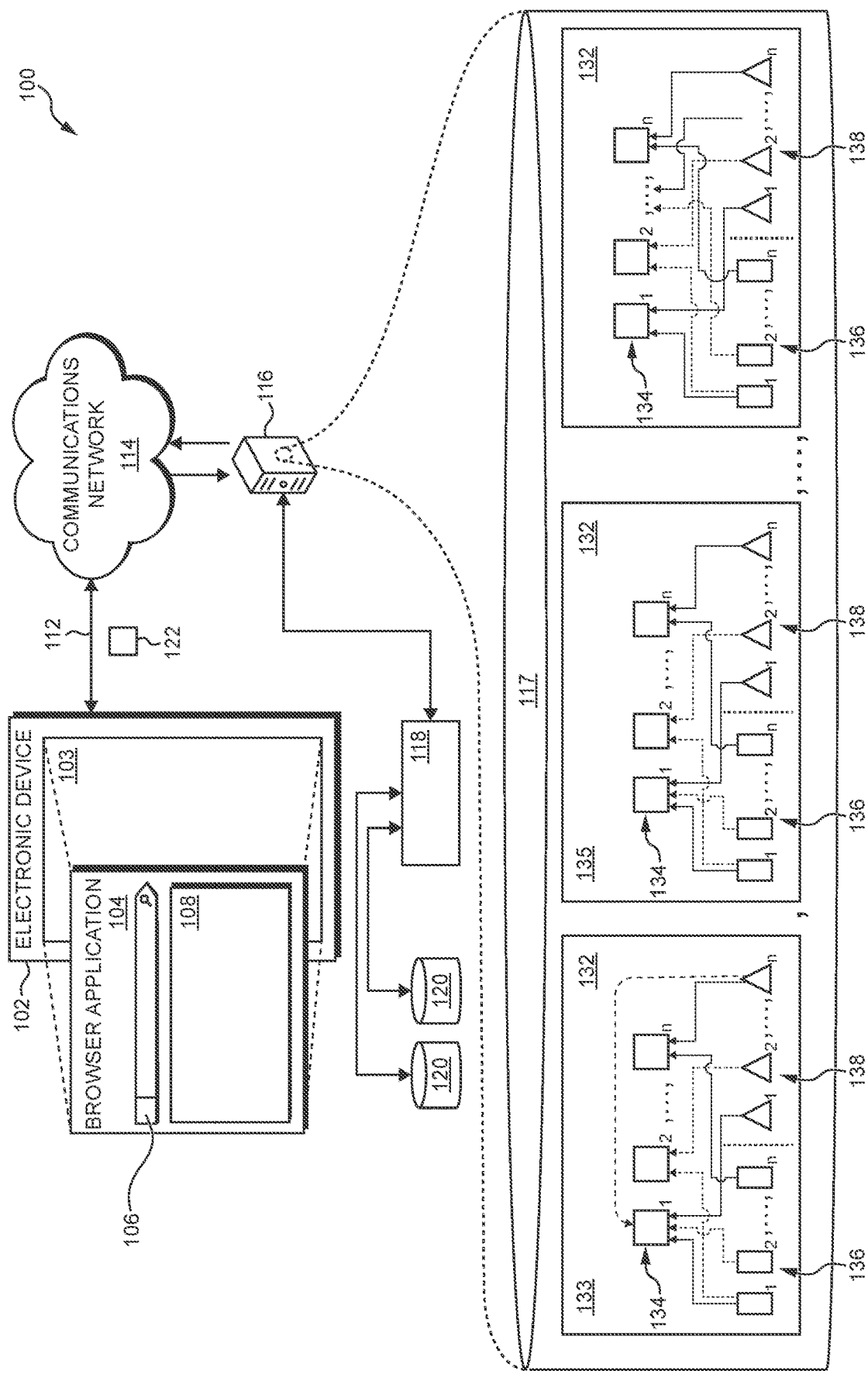
FIG. 1 depicts a schematic diagram of a distributed computer-processing system suitable for implementing non-limiting embodiments of the present technology.

Referring to FIG. 1, there is shown a schematic diagram of a system 100 suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case.

In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity. Additionally, while particular examples of functionality that can be provided by the present technology have been set forth below, other functionality can also be achieved by the present technology based on the present disclosure.

Turning to FIG. 1, the present non-limiting embodiment of the system 100 comprises an electronic device 102, also referred to as the user's electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered or the like.

In accordance with the non-limiting embodiments of the present technology, the electronic device 102 is a smartphone which comprises the display 103, which can be implemented as a touch sensitive display serving both for receiving user inputs via gestures and for providing visual outputs to the user; a network communication interface (such as a modem, a network card and the like) for two-way communication over a communications network 114; and a processor coupled to the user input interface, the user output interface and the network communication interface, the processor being configured to execute various routines, including those described herein below. To that end the processor may store or have access to computer readable commands which commands, when executed, cause the processor to execute the various routines described herein.

The implementation of the electronic device 102 is not particularly limited. It is contemplated that the electronic device 102 may be implemented as a personal computer (desktop, laptop, netbook, etc.) or as another type of a wireless electronic device (for example, a tablet and the like). The general implementation of the electronic device 102 is known in the art and, as such, will not be described here at much length.

The electronic device 102 comprises hardware and/or software and/or firmware (or a combination thereof), as is known in the art, to execute and display a browser application 104. Generally speaking, the purpose of the browser application 104 is to enable the user (not depicted) to access one or more web resources. The browser application 104 has a command interface 106 and a browsing interface 108, both of which may be empty when the user has not yet started inputting any web resource addresses or any queries. In some implementations, the command interface 106 and the browsing interface 108 could be configured to access a default web resource such as a "home page" for example.

In the present non-limiting embodiment, the command interface 106 is implemented as an "omnibox" field—an entry field incorporating the functionality of a field for entering Uniform Resource Locators (URLs) and a field for entering search queries for a search engine to search. Accordingly, within the depicted embodiment, the user can use the command interface 106 for both entering search queries and resource locations such as URLs.

The browsing interface 108 is configured for displaying to the user: (i) a web resource associated with for example a URL entered into the command interface 106; (ii) a web page generated in response to the search query entered in the command interface 106; or (iii) any other form of navigation pane. It will be appreciated that the particular layout of the command interface 106 and the browsing interface 108 of FIG. 1 is provided as an example only an is not limiting. It is contemplated that depending on each particular implementation of the browser application 104 and/or the electronic device 102 executing the browser application 104, the command interface 106 and the browsing interface 108 could be located in different positions on the screen of the electronic device 102, could be animated, could be configured to appear and disappear depending on each given user action, and so on.

With the features described above, the browser application 104 allows the user to navigate to any one of a plurality of different web resources. In addition to enabling the user to navigate to a desired web resource, the browser application 104 is configured to selectively display supplemental content to the user via a recommendation block 124 (FIG. 3), which can be displayed in various different states on the display 103 of the electronic device 102 in association with a given web resource being viewed by the user.

The electronic device 102 is coupled to the communications network 114 via a communication link 112. In some non-limiting embodiments of the present technology, the communications network 114 is the Internet. In other embodiments of the present technology, the communications network 114 can be implemented differently, such as any wide-area communications network, local-area communications network, a private communications network and the like. How the communication link 112 is implemented is not limited and will depend on how the electronic device 102 is implemented. Recalling that the electronic device 102 is implemented, in this example, as a laptop, the communication link 112 can be either wireless (such as WiFi®, Bluetooth® or the like) or wired (such as an Ethernet based connection).

It should be expressly understood that the presently described implementations for the electronic device 102, the communication link 112 and the communications network 114 are provided for illustration purposes only. As such, those skilled in the art will easily appreciate that other specific implementations for the electronic device 102, the communication link 112 and the communications network 114 are possible. By no means are the examples provided herein meant to limit the scope of the present technology.

Also coupled to the communications network is a server 116. In the depicted non-limiting embodiment of present technology, the server 116 is a single server. In some alternative non-limiting embodiments of the present technology, the functionality of the server 116 is distributed and/or implemented via multiple servers. The server 116 is implemented as a Dell™ PowerEdge™ Server running the Microsoft™ Windows Server™ operating system. The hardware of the server 116 is well known. However, briefly speaking, the server 116 comprises a communication interface (not depicted) structured and configured to communicate with various entities (such as the electronic device 102, for example and other devices potentially coupled to the communications network 114) via the communications network 114. The server 116 further comprises at least one processor (not depicted), a non-transient memory (not depicted) in communicatively coupled to the at least one processor, and at least one non-transient storage device 117, such as a hard disk or a solid state drive, in communication with the at least one processor.

The at least one processor is operationally connected with the communication interface and structured and configured to execute methods described herein. The non-transient memory stores instructions that, when executed by the at least one processor, cause the at least one processor to carry out the methods described herein. The server 116 can be implemented with any suitable hardware and/or software and/or firmware or a combination thereof, so long as the server 116 is configured specifically as described herein and is capable of executing the particular methods described herein.

In some embodiments of the present technology, the server 116 is operated by an operator of a search engine, such as the operator of the Yandex™ search engine available at www.yandex.ru. In some embodiments, the server 116 is operated by the same entity that has provided the browser application 104. In alternative embodiments, the server 116 can be operated by an entity different from the one who has provided the browser application 104. It is contemplated that the server 116 can be operated by any other one or more suitable entity, such as another search engine operator and the like.

In accordance with the non-limiting embodiments of the present technology, the server 116 is in communication with a content recommendation server 118 which can be provided as a software module executed at the server 116. It is contemplated that the content recommendation server 118 could be alternatively provided in the form of a hardware server separate from the server 116, or in any other suitable manner. The content recommendation server 118 monitors the content being viewed by the user via the browser application 104 and identifies supplemental content that could be potentially presented to the user in association with the content being viewed by the user. In accordance with the non-limiting embodiments of the present technology, the content recommendation server 118 obtains the supplemental content from content available to the content recommendation server 118 from a plurality of content databases 120.

The content recommendation server 118 selects the supplemental content from content available via the content databases 120 by executing various content selection algorithms. The content recommendation server 118 is not limited to executing any particular content selection algorithms or any particular number or configuration or identity of content databases 120. The content recommendation server 118 could execute any suitable algorithm(s) and access any suitable number of database(s) to select and retrieve content for potential presentation of the user. It is further contemplated that the content recommendation server 118 need not actively monitor the content being viewed by the user in order to provide suggestions of supplemental content, but could provide suggestions of supplemental content via a query-based algorithm or any other suitable content provisioning algorithm for example.

Similar to the content recommendation server 118, how the browser application 104 is implemented is also not particularly limited. One example of the browser application 104 may be embodied as a Yandex™ browser. The Yandex™ browser in common with other browser applications provides a navigation pane, sometimes referred to as a start page, as a page first loaded when the browser is started or a new window or tab page is opened. Navigation panes such as start pages are typically distinct from a browser "home page", which is the page a browser displays in response to a user selecting/clicking a home button.

When a user of the electronic device 102 accesses a given web resource via the browser application 104, the browser application 104 displays the web resource in the browsing interface 108. The user is then able to navigate the web resource in a web page-by-page manner for example, scroll through any given web page of the web resource, and interact with objects displayed on a given web page of the web resource. In accordance with the non-limiting embodiments of the present technology, to interact with the web resource, the user is able to perform any one or a combination of user actions such as: a back scroll, a scrolling action, a gesture inputted into the display 103 (the display 103 being an example of an input-output device), an actuation of at least one key of a keyboard if one is connected to the electronic device 102 via Bluetooth™ for example, and/or an actuation of at least one button of a mouse keyboard if one is connected to the electronic device 102 via Bluetooth™ for example. In accordance with the non-limiting embodiments of the present technology, a scrolling action reaching an end of a displayed page of the web resource is also a user action.

Figure 2:
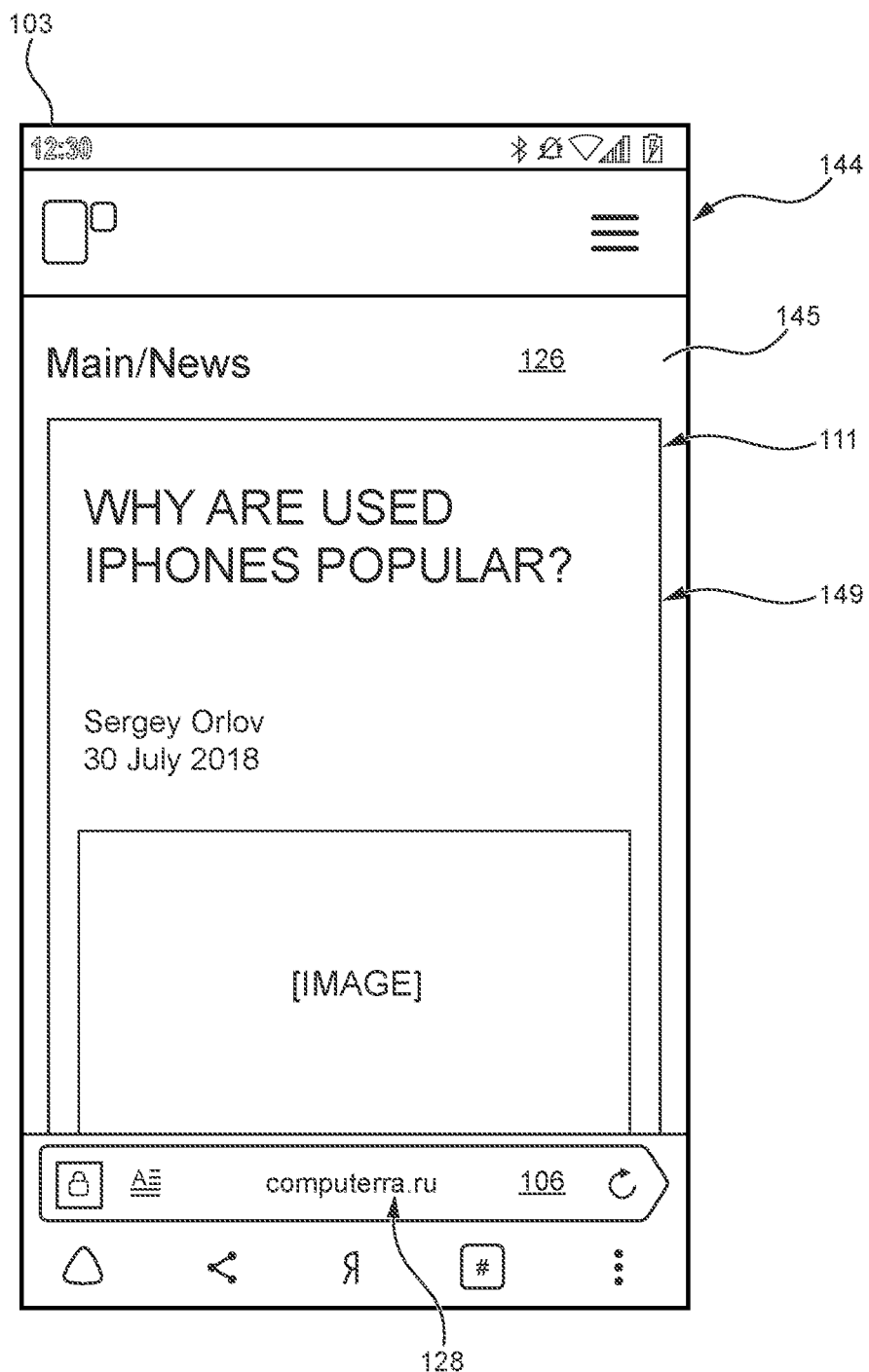
FIG. 2 depicts an electronic device displaying a web page of a web resource, the web resource being displayed in a given display state.

FIG. 2 shows an example web page 126 of an example web resource 145 accessed by a user of the electronic device 102 via the browser application 104. As shown, the web page 126 is available via a corresponding URL 128, a shortened form of which is displayed in the command interface 106. In this particular example, the web resource 145 is a blog that includes an article dated Jul. 30, 2018, entitled "Why are used iPhones™ popular?" and authored by "Sergey Orlov". As the user is viewing the web page 126, the server 116 receives an indication of the browser application state 146 of the browser application 104 displaying a top portion 111 of the web page 126, which is a given display state 149 of the web resource 145. In at least some non-limiting embodiments, the display state 149 is a display state for which no supplemental content is configured to be selectively displayed. Accordingly, in such embodiments, the server 116 does not send any communication to the electronic device 102 in response to receiving the indication of the display state 149 and does not cause the browser application 104 to display a recommendation block 124 on the display 103.

In accordance with the non-limiting embodiments of the present technology, as the user scrolls through the web page 126 from the top portion 111 to an end portion 127 thereof, the server 116 receives an indication of the browser application state 146 of the browser application 104 displaying the end portion 127 of the web page 126, which is another display state 150 of the web resource 145. In at least some non-limiting embodiments of the present technology, the display state 150 is a pre-defined display state for which supplemental content is to be selectively presented as described below. In accordance with some such non-limiting embodiments of the present technology, the indication associated with the end portion 127 includes the display state 150 of the web resource 145 being displayed in the browser application 104 and an indication of a user action (in this example, scrolling as described above). It is contemplated that such indications could be communicated to the server 116 in the form of one or more data packets for example, or via any other suitable data transfer method or technology. In accordance with the non-limiting embodiments of the present technology, the display state 150 is one of possible different display states at which supplemental content could be selectively presented by using the present technology. As a non-limiting example, in some embodiments, supplemental content could be selectively presented by using the present technology at any one of the display state 149 and the display state 150.

Also in some non-limiting embodiments of the present technology, the server 116 could be configured to selectively present supplemental content in response to receiving an indication of one or more particular combinations of: a) a display state of the browser application 104, and b) a given user action executed by the user at that display state of the browser application 104. In accordance with the non-limiting embodiments of the present technology, the server 116 is configured to selectively present supplemental content in response to a user scrolling through a given web page and reaching an end portion of the given web page. This non-limiting configuration is described in more detail next.

Figure 3:
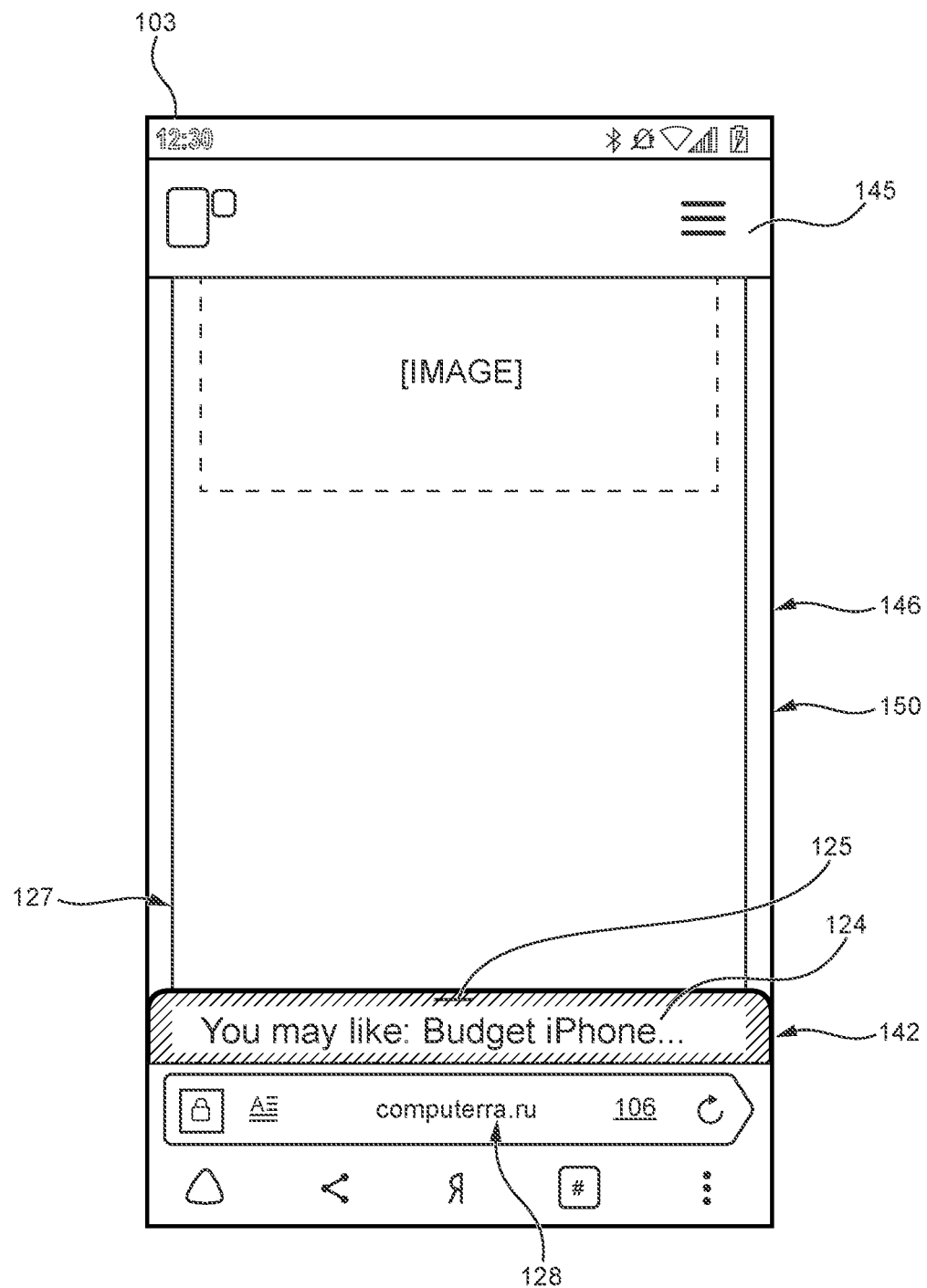
FIG. 3 depicts the electronic device of FIG. 2, the electronic device displaying the web page of the web resource, the web resource and the web page being in another given display state, the other given display state including a display of a recommendation block containing supplemental content.

Referring to FIG. 3 now, in such a configuration the server 116 may receive an indication of the browser application 104 displaying the end portion 127 of the web page 126 (the pre-defined display state 150 for which content is to be selectively presented), and an indication of the scrolling action executed by the user and reaching the end portion 127 of the web page 126. Other possible browser application states at which the server 116 could be configured to selectively display supplemental content could be, for example, the browser application 104 displaying a start of the web page 126, a middle of the web page 126, a pre-defined part of the web page 126, finishing watching a video, finishing listening to a streaming audio track, user clicking a "back" button, user clicking the omnibox, and so on. Other possible browser application states are contemplated depending on each particular embodiment of the browser application 104 and each particular embodiment of the web resource being viewed.

Continuing with the example shown in FIG. 3, the server 116 is configured, in response to receiving the indication of the browser application state 146 and the indication of the user scrolling action, to determine a plurality of features of the web resource being viewed. In some non-limiting embodiments of the present technology, the browser application 104 and/or the user's electronic device 102 is configured, in response to receiving the indication of the browser application state 146 and the indication of the user scrolling action, to determine a plurality of features of the web resource being viewed. To maintain clarity of the present description, only the server 116 configuration examples are described. It is to be understood that these server 116 configurations could instead be analogous configurations of the browser application 104 and/or the user's electronic device 102. It is contemplated that in some such configurations, such as in configurations in which the browser application 104 and/or the user's electronic device 102 are configured to carry out all of the functions described herein to be executed by the server 116, the server 116 could be omitted.

In accordance with the non-limiting embodiments of the present technology, the features include the URL 128, features associated with the URL 128, keywords (example: "iPhone™", "cell phone", "trends", "news" and so on) associated with the content of the web page being viewed, the title of the author of the web page being viewed (in this example, "Sergey Orlov"), and the date of the web page being viewed (in this example, Jul. 30, 2018).

In some embodiments, the features also include data representative of a plurality of prior user actions by which the user had interacted with the web resource via the browser application 104, at least some of the plurality of prior user actions having caused the recommendation block 124 to be displayed via the browser application 104. It is contemplated that in some cases, fewer or more features of a given web resources would be available to the server 116. It is contemplated that in some cases, the server 116 could be configured to determine fewer or more features of a given web resources.

In accordance with the non-limiting embodiments of the present technology, the server 116 provides at least some of the determined features of the web resource to the content recommendation server 118 as an input. In response, at least in part based on the determined features, the server 116 receives an indication of supplemental content 130 (FIG. 4) that can potentially be presented to the user via the browser application 104 in association with the web resource being viewed in response to the user reaching the end of the given web page 126.

Figure 4:
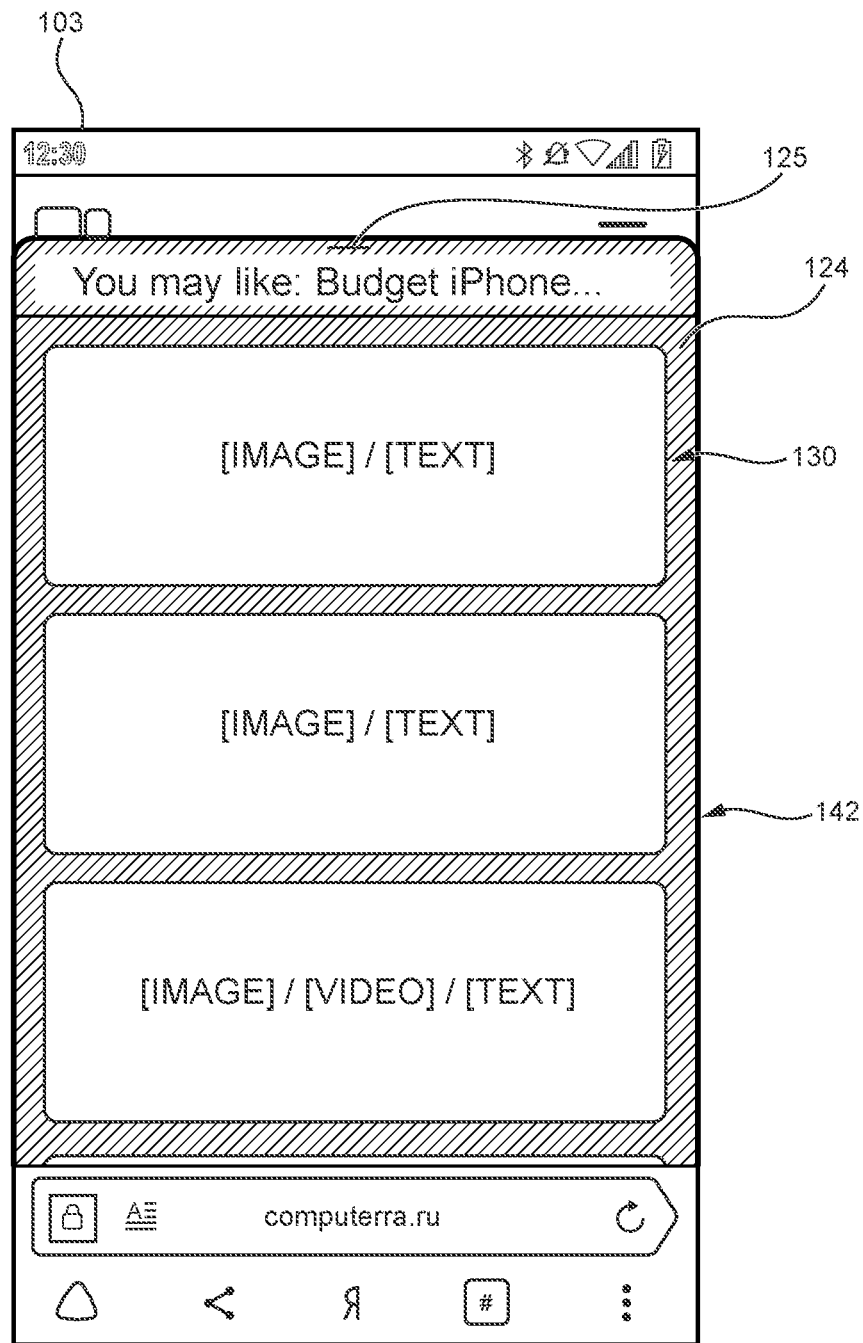
FIG. 4 depicts the electronic device of FIG. 2, the electronic device displaying the web page of the web resource, the web resource and the web page being in yet another given display state, the yet other given display state including a display of the recommendation block of FIG. 3, the recommendation block being in an expanded visual state.

In the present example, and referring back to FIG. 2, the web page 126 being viewed by the user has to do with used iPhones™, and accordingly at least some of the determined features are in one way or another related to iPhones™. Accordingly, as shown in FIG. 4, based on at least some of these features, the content recommendation server 118 has provided an indication of a series of articles, including an article about budget iPhones™, an article about smartphone processors, and an article about a particular design of an iPhone™ keyboard, for possible presentation to the user as the supplemental content 130.

In accordance with the non-limiting embodiments of the present technology, once the server 116 receives the indication of the supplemental content 130, the server 116 executes a Machine Learning Algorithm (MLA) based on the browser application state 146 and at least some of the determined features of the web resource 145, to determine a recommendation score (not depicted) associated with the potentially recommendable supplemental content 130. To this end, prior to use the MLA is trained based on user interactions with training recommendation blocks and based on features associated with training web resources that were accessed by users to be presented with respective ones of the training recommendation blocks.

More particularly, in at least some non-limiting embodiments of the present technology, during the training of the MLA, human assessors were presented with training sets that included web resources associated with respective URLs, each web resource and each URL being associated with features as described above. The assessors were presented with training recommendation blocks (not depicted) containing recommended content while viewing different ones of the web resources. In cases where the assessors selected the recommended content and/or spent at least a pre-determined amount of time viewing the content (or otherwise indicated that the content was useful or of interest), the respective training recommendation blocks were marked as positive training examples.

In cases where the assessors did not select the recommended content and/or selected and closed it after less than the pre-determined amount of time (or otherwise indicated that the content was not useful or not of interest), the respective training recommendation blocks were marked as negative training examples for the MLA. For each case of a positive or a negative determination, a corresponding recommendation score was assigned, indicating a corresponding probability that the content would be of interest to the user if presented to a different user.

In summary, the MLA was trained based on assessor assessments, which served the purpose of offline markers for determining which of the training recommendation blocks were useful to the assessors and which of the training recommendation blocks were not useful to the assessors. The MLA was thereby trained to correlate the features of the web resources and/or the respective URLs with the offline markers and to output a recommendation score given a particular combination of features provided to the MLA as input. It is contemplated that a different MLA training method could be used, so long as the functionality described in herein is achieved.

In use, once the server 116 receives a recommendation score as output from the MLA, the server 116 processes the recommendation score and determines whether the recommendation score indicates that the supplemental content 130 provided by the content recommendation server 118: a) should be presented, or b) should not be presented.

In cases where the recommendation score indicates that the supplemental content 130 should be presented, the server 116 sends at least one data packet 122 (FIG. 1) to the browser application 104 and thereby causes the browser application 104 to display the recommendation block 124 (as is shown in FIG. 3) containing the supplemental content 130 on the display 103 of the user's electronic device 102. More particularly, the at least one data packet 122 is configured to cause the browser application 104 to display the recommendation block 124 containing the supplemental content 130 on the display 103 of the electronic device 102 in a particular state defined by the at least one data packet 122.

On the other hand, in cases where the recommendation score indicates that the supplemental content 130 should not be presented, the server 116 does not send the at least one data packet 122 to the browser application 104 and the browser application 104 therefore does not display a recommendation block 124 containing the supplemental content 130.

More particularly, in accordance with the non-limiting embodiments of the present technology, the recommendation score provided by the MLA includes a confidence level parameter determined by the MLA based on the at least some of the determined features of the web resource. The confidence level parameter is indicative of a probability, which can also be referred to as a confidence level, that the supplemental content 130 would be of interest to the user if presented to the user. In turn, the server 116 is provisioned, for example by an administrator of the server 116, with a pre-defined probability threshold. In some embodiments, the pre-defined probability threshold is stored in the form of a threshold parameter in the non-transient storage device 117 and/or the non-transient memory of the server 116. The server 116 compares the probability indicated by the determined confidence level parameter to the pre-defined probability threshold, and sends the at least one data packet 122 if the probability is above the pre-defined probability threshold. The server 116 does not send the at least one data packet 122 if the probability is below the pre-defined probability threshold.

How the supplemental content 130 is displayed is not particularly limited and several scenarios are envisioned, in accordance with the non-limiting embodiments of the present technology. To give a non-limiting example, suppose the recommendation score provided by the MLA had indicated that the supplemental content 130 should be presented, the server 116 has accordingly sent the at least one data packet 122 to the browser application 104, and the browser application 104 has in response displayed the recommendation block 124 in a "snippet state" as shown in FIG. 3. At the point in time shown in FIG. 2, the user is then able, if the user wishes to view the supplemental content 130, to manually expand the recommendation block 124 by swiping upward starting from a pull bar 125 of the recommendation block 124 (as an example).

FIG. 3 shows a resulting expanded visual state of the recommendation block 124. In this state, the supplemental content 130 has become visible to the user as shown in FIG. 3. Notably, in the present example the browser application 104 has first displayed the recommendation block 124 in the snippet state shown in FIG. 2 and not immediately in the expanded state shown in FIG. 3. In the present example, the snippet state was dictated by the configuration of the at least one packet 122 that the browser application 104 received from the server 116 and processed. The particular display state as dictated by the at least one packet 122 relates to the second broad aspect of the present technology that was described above in the Summary section of this specification. This second broad aspect of the present technology is described in more detail next.

Referring for the moment back to FIG. 1, in the above-mentioned example and in accordance with the non-limiting embodiments of the present technology and of the server 116, the at least one packet 122 received and processed by the browser application 104 contained a lookup table 132. The lookup table 132 was selected by the server 116, prior to the server 116 sending the lookup table 132 to the browser application 104, from a plurality of lookup tables 132 accessible to the server 116. The selected lookup table 132 was included by the server 116 in the at least one packet 122 sent to the browser application 104.

In the present technology, and as described in more detail herein below, the lookup tables 132 are used for mapping current states and/or various different user actions and/or various different types of content and/or different content to particular states of the recommendation block 124 via which the content is to be presented on the display 103 of the user's electronic device 102. More particularly, the lookup tables 132 determine a next state of the recommendation block 124 via which supplemental content is to be presented to the user of the electronic device 102 at each relevant point in time. This determination is based on an input of a combination of i) the current state of the recommendation block 124 and b) the user action. For each such particular combination, each different lookup table 132 dictates a corresponding next state of the recommendation block 124.

Each of the lookup tables 132 is constructed manually, such as by a system administrator for example. However, other methods of constructing the lookup tables 132, including automatic and machine learning based methods are contemplated. The lookup tables 132 are one example of a presentation selection algorithm that could be used to implement the present technology. It is contemplated that one or more different presentation selection algorithms, such as one or more different data structures, could be used instead of or in combination with the lookup tables 132. Referring back to FIG. 1, in accordance with the non-limiting embodiments of the present technology, the lookup tables 132 are stored on the non-transient storage device 117 of the server 116. Other storage locations, including the non-transient memory of the server 116 and other locations such as remote storage locations, are equally contemplated.

As schematically shown in FIG. 1, in accordance with the non-limiting embodiments of the present technology, each of the lookup tables 132 comprises at least one user action 138 and a plurality of different possible current states 136, shown as rectangles, of the recommendation block 124 as possible inputs for providing an output in the form of a next state 134 of the recommendation block 124. Each lookup table 132 further comprises a plurality of different possible next states 134, shown as rectangles, of the recommendation block 124 as possible outputs based on the possible inputs.

In accordance with the non-limiting embodiments of the present technology, the at least one user action 138 is a plurality of different possible user actions 138 and each lookup table 132 correlates each particular combination of: i) a given current state 136 of the recommendation block 124 of the plurality of different possible current states 136 of the recommendation block 124, and ii) a given user action 138 of the plurality of different possible user actions 138, to (iii) one next state 134 of the plurality of different next states 134 of the recommendation block 124. In other words, each lookup table 132 is configured to output a next state 134 of the recommendation block 124 from the plurality of different possible next states 134 of the recommendation block 124 as output in response to input into that lookup table 132 of a given combination of the current state 136 of the recommendation block 124 and the pre-determined user action 138 (in this case, the action of scrolling to the end of the web page 126).

For example, as shown with arrows in FIG. 1, lookup table 133 correlates a first "1" current state 136 and a first "1" user action 138 to a first "1" next state 134 of the recommendation block 124. Similarly as shown, the lookup table 133 correlates the first "1" current state 136 and a second "2" user action 138 to a second "2" next state 134 of the recommendation block 124, which second "2" next state 134 is different from the first "1" next state 134 of the recommendation block 124. A technical effect of this mapping in at least some cases is that the present technology allows, for example a system administrator, to configure the server 116 to display particular desired next states of the recommendation block 124 for one or more different particular combinations of: i) a particular current state of the recommendation block 124 and ii) a particular user action.

In accordance with the non-limiting embodiments of the present technology, at least some of the given current state and at least some of the given next state of the recommendation block 124 in each given lookup table 132 includes a virtual state and a visual state 142 (FIG. 3) of the recommendation block 124. In the virtual state, such as the one shown in FIG. 2, the recommendation block 124 is not visible. In a visual state 142, one example of which is shown in FIG. 3 and another example of which is shown in FIG. 4, the recommendation block 124 is visible.

In at least some cases, using visual state 142 and virtual state allow to configure the lookup tables 132 to, for example, avoid displaying the recommendation block 124 again after the user has already appreciated the supplemental content 130 presented to them via a first instance of displaying the recommendation block 124. For example, where the user has viewed a given supplemental content 130 after being presented with it a first time in response to a particular user action, the next time when the server 116 detects the particular user action while the recommendation block 124 is being displayed and while still receiving the same supplemental content 130 from the content recommendation server 118, a lookup table 132 received by the browser application 104 could cause the browser application 104 to display the recommendation block 124 in a virtual (invisible) state. In some cases, this reduces impediments to the user's browsing experience.

To provide the virtual state, the selected one of the lookup tables 132 could, for example, assign the virtual state as the output for the particular combination of the given current state and the particular user action inputted by the browser application 104 into the selected one of the lookup tables 132. To this end, the server 116 could be configured, after the sending to the browser application 104 the at least one data packet 122, to receive an indication of the user having viewed the supplemental content 130 contained in the recommendation block 124. In such configurations, in response to receiving the indication of the user having viewed the supplemental content, the server 116 may assign a given virtual state to the recommendation block 124 as the current state of the recommendation block 124.

In some such embodiments, the given virtual state is one of the different possible current states in each lookup table 132 of the plurality of different lookup tables 132. In some such cases, at least some of the lookup tables 132 could be configured to output the next state of the recommendation block 124 as a virtual state in response to an input of a combination of a current virtual state of the recommendation block 124 and a user action. It is contemplated that in some embodiments, virtual states could be implemented differently and/or could be omitted from the present technology.

Further, in accordance with the non-limiting embodiments of the present technology, each given lookup table 132 that is sent by the server 116 to the user's electronic device 102 can be selected by the server 116 out of the plurality of different lookup tables 132 accessible by the server 116 based on the confidence level parameter determined by the MLA. More particularly, each lookup table 132 corresponds to one confidence level range of a plurality of different confidence level ranges accessible by the server 116, and determines a particular next state of the recommendation block 124 based on a given combination of: i) the current state of the recommendation block 124 and ii) the user action, the particular next state of the recommendation block 124 being different from the next state of the recommendation block 124 determined by at least one of the rest of the lookup tables 132 based on the same given combination of the current state of the recommendation block 124 and the user action.

Even more particularly, each given lookup table 132 that is sent to the browser application 104 is selected by the server 116 out of the lookup tables 132 by the server 116: a) determining a correspondence between the confidence level indicated by the confidence level parameter determined by the MLA and a matching one of the plurality of different confidence level ranges, and b) selecting the lookup table 132 to be the one of the plurality of different lookup tables 132 that corresponds to the matching one of the plurality of different confidence level ranges. In some such non-limiting embodiments of the present technology, the lookup tables 132 are pre-defined such that, for each given current state and user action combination, a next lookup table 132 selected based on a relatively higher confidence level determined by the MLA causes a relatively more prominent display of the recommendation block 124 in comparison to the display of the recommendation block 124 caused by a next lookup table 132 selected based on a relatively lower confidence level determined by the MLA.

For example, in accordance with the non-limiting embodiments of the present technology, there may be five different pre-defined confidence level ranges, which in some embodiments are adjustable by a system administrator for example: 1) 0-20% confidence, 2) 20-40% confidence, 3) 40-60% confidence, 4) 60-80% confidence, 5) 80-100% confidence. If for example the confidence level indicated by the confidence level parameter determined by the MLA indicates a confidence level of 15%, then the server 116 determines that the matching confidence level range is range number 1). Accordingly, the server 116 selects the one of the lookup tables 132 that corresponds to range number 1). In one example, lookup table 133 could be the one that is pre-defined to correspond to range number 1). In such an example, the lookup table 133 would be selected and sent by the server 116 to the browser application 104 for processing. In some non-limiting embodiment, for a given current state and user action combination, this selected lookup table 133 could cause the browser application 104 to display a relatively less prominent display of the recommendation block 124 than, for example, lookup table 135 that would have been selected and sent to the browser application 104 if the confidence level parameter determined by the MLA had indicated a confidence level in range number 2).

Further, in some embodiments, each given lookup table 132 sent by the server 116 to the user's electronic device 102 is selected by the server 116 out of the plurality of different lookup tables 132 further based on a determination of at least one particular content type that the supplemental content provided by the content recommendation server 118 is associated with. To this end, the plurality of lookup tables 132 may be grouped into a plurality of groups of lookup tables. Each given group of lookup tables may correspond to at least one particular type of content that the supplemental content 130 could be associated with.

For example, five different lookup tables 132, each corresponding to one of the five confidence level ranges described above, could be pre-defined to correspond to video content. Another five different lookup tables 132, each corresponding to one of the five confidence level ranges described above, could be pre-defined to correspond to audio content. Another five different lookup tables 132, each corresponding to one of the five confidence level ranges described above, could be pre-defined to correspond to textual and image content. Another five different lookup tables 132, each corresponding to one of the five confidence level ranges described above, could be pre-defined to correspond to a combination of video and textual content. It is contemplated that any desired number of lookup tables 132 could be defined for any desired number of different content types and confidence level ranges. Other possible types of content could include, for example, blog type content, digital magazine type content, news type content, weather forecast type content, and so on.

According to the above, in embodiments containing the above table groupings, before determining the confidence level correspondence, the server 116 determines a type of content that the supplemental content 130 to provided by the content recommendation server 118 is associated with. As shown in FIG. 2, in the present example the content is textual content mixed with image content. Accordingly, the server 116 would select the group of five lookup tables 132 that are pre-assigned to the "textual and image content" type. Next, the server 116 would select a lookup table 132 only from this corresponding group of five lookup tables 132, based on the confidence level matching as described above.

In the present example, let's say that the selected lookup table 132 is again the lookup table 133. In this example therefore, the lookup table 133 would have been pre-constructed, for example by a human assessor or a system administrator, in a way to cause the browser application 104 to display the recommendation block 124 in a way optimized for display of text and images, at least when the recommendation block 124 is expanded as shown in FIG. 3. Additionally, in the present example, since the lookup table 133 corresponds to the lowest confidence level range 1), the lookup table 133 would have been pre-constructed, for example by the human assessor, to cause the browser application 104 to display (at least initially) the recommendation block 124 in a relatively smaller size, compared to a size of the recommendation block 124 that would be dictated by another one of the group of five lookup tables 132.

In a similar vein, in some embodiments, each given lookup table 132 sent by the server 116 to the user's electronic device 102 is selected by the server 116 out of the lookup tables 132 further based on a determination of a type of the user's electronic device 102. In such embodiments, the lookup tables 132 are grouped into parent groups that comprise the content-type based lookup table groups described above. In some such cases, each given parent group would be pre-defined to correspond to a particular type of device 102 executing the browser application 104.

For example, there may be two different parent groups of lookup tables 132, one corresponding to portable devices and one corresponding to desktop computers. Accordingly, in such examples, the server 116 could determine a type of the user's electronic device 102 to be a smartphone. A smartphone falls under the portable devices category. Accordingly, before selecting a given content-based group of lookup tables 132, the server 116 would select the parent group of lookup tables 132 that corresponds to portable devices. The server 116 would then select a lookup table 132 only from that parent group, based on the content type(s) and confidence level as described above.

It is contemplated that in other embodiments, additional and/or different parent groups and/or sub-groups of lookup tables 132 could be defined for additional customization of the behaviour to be exhibited by the recommendation block 124. In each case, each particular parent group and/or sub-group of lookup tables 132 could be constructed to optimize the display and behaviour exhibited by the recommendation block 124 for each particular type of device, display of the device, and other possible characteristics of the device.

As described above, the server 116 is configured to send the selected lookup table 132 to the user's electronic device 102 each time in response to receiving a pre-determined one or more combinations of a display state and a user action. However, in some embodiments, the server 116 is configured to pre-send the lookup tables 132 to the browser application 104 and to merely select an indication of a selection of a given lookup table 132 to the browser application 104 in the at least one data packet 122. In such embodiments, the lookup tables 132 could be stored on the user's electronic device 102 and the at least one data packet 122 would not need to contain the selected lookup table 132.

In some such cases, for each given user action in response to which a recommendation block 124 is to be selectively presented, the at least one data packet 122 could be configured to cause the browser application 104 to process the given lookup table 132 based on the indication of the selected lookup table 132 in the at least one data packet 122. The browser application 104 could then process the selected lookup table 132 stored on the electronic device 102 in the same way as if the selected lookup table 132 was sent to the browser application 104.

Figure 5:
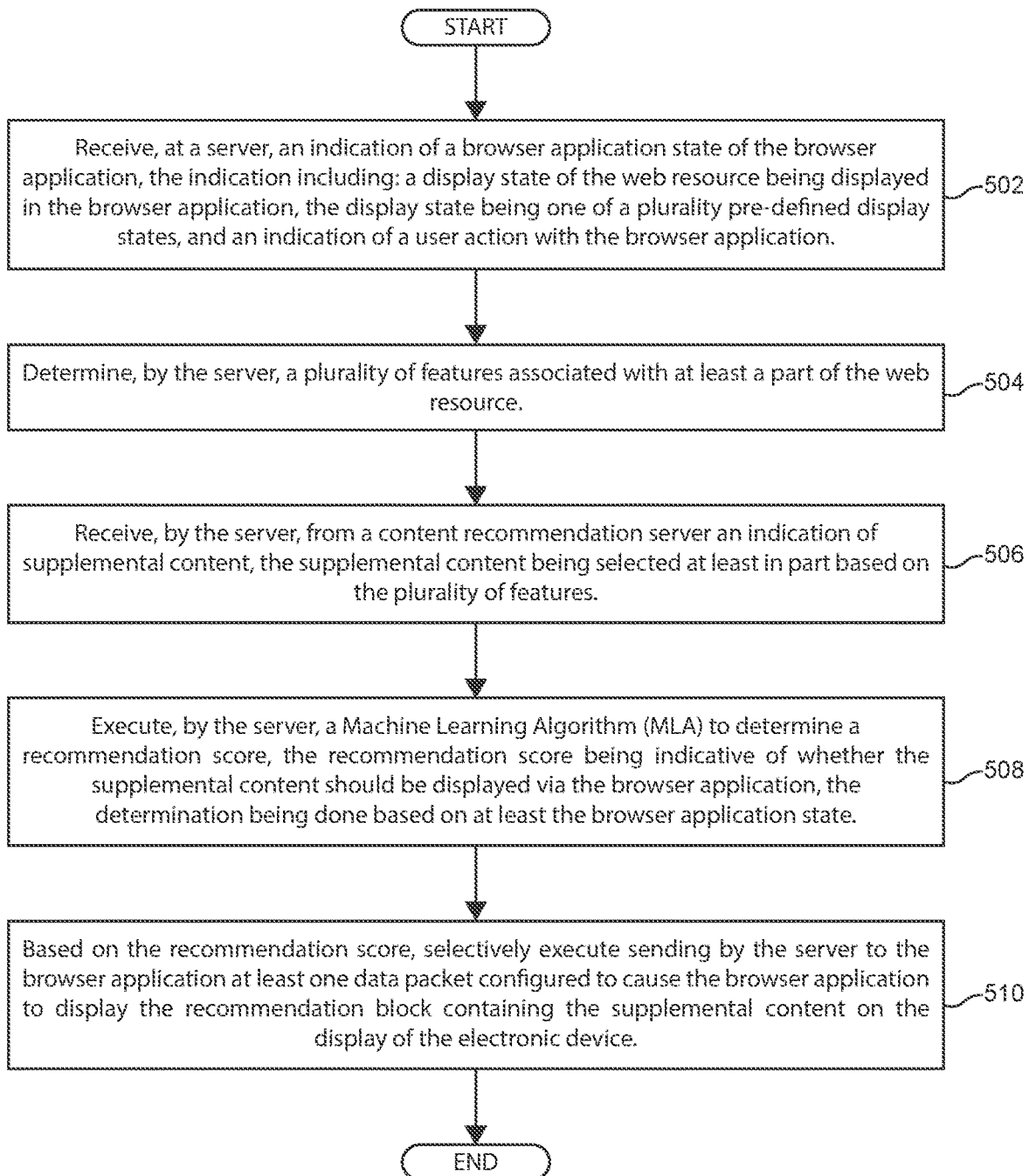
FIG. 5 shows a logic flow diagram depicting a non-limiting implementation of a method according to the present technology.

With the above non-limiting examples of configurations of the server 116 in mind, and now referring to FIG. 5, a method 500 of selectively presenting the recommendation block 124 to a user accessing a web resource in the browser application 104 being displayed on the display 103 of the electronic device 102 is described next.

Step 502—receiving, at a server, an indication of a browser application state of the browser application, the indication including: a display state of the web resource being displayed in the browser application, the display state being one of a plurality pre-defined display states, and an indication of a user action with the browser application.

In one embodiment, the method 500 starts at step 502, which includes receiving, at the server 116, an indication of a browser application state of the browser application 104. The indication includes: a display state 150 of the web resource being displayed in the browser application 104, the display state 150 being one of a plurality of pre-defined display states 148, 150, and an indication of a user action with the browser application 104.

For example, the browser application 104 in FIG. 2 is shown in a first browser application state 144 in which the browser application 104 displays a top portion of the web page 126. In this state, the top portion of the web page 126 is a display state 148 of the web resource containing the web page. As another example, the browser application 104 in FIG. 3 is shown in a second browser application state 146 in which the browser application 104 displays a bottom portion of the web page 126. In this example, the bottom of the web page 126 is the display state 150 for which the server 116 is configured to selectively provide supplemental content via the recommendation block 124. In this example, the first browser application state 144 and the second browser application state 146 are two of the plurality of possible pre-defined display states of the browser application 104.

The other pre-defined display states of the browser application 104 could include, for example, the browser application 104 displaying a middle portion of the web page 126, displaying another web page of the web resource, displaying a particular web resource of a pre-defined plurality of web resources, and so on. It is contemplated that the server 116 could be configured to selectively display supplemental content 130 via the recommendation block 124 as described in this specification at other browser application states, either in addition to or instead of the browser application state 146 having the display state 150.

Step 504—determining, by the server, a plurality of features associated with at least a part of the web resource.

At step 504 the method 500 proceeds with determining, by the server 116, a plurality of features associated with at least a part of the web resource. In the present example, the server 116 receives the URL 128, features associated with the URL 128, and keywords (example: "iPhone™", "cell phone", "trends", "news" and so on) associated with the content of the web page 126 being viewed.

Step 506—receiving, by the server, from a content recommendation server an indication of supplemental content, the supplemental content being selected at least in part based on the plurality of features.

Step 506 includes receiving, by the server 116, from a content recommendation server such as the content recommendation server 118, an indication of supplemental content, the supplemental content being selected at least in part based on the plurality of features determined at step 504.

In accordance with the non-limiting embodiments of the present technology, the content recommendation server 118 receives the determined features (in this example, the URL 128, features associated with the URL 128, and keywords associated with the content of the web page 126) as input to one or more content selection algorithms. The one or more content selection algorithms allow the content recommendation server 118 to receive the supplemental content from one or more content databases 120. The content selection algorithms are not particularly limited and any suitable configuration and number thereof could be used.

Step 508—executing, by the server, a Machine Learning Algorithm (MLA) to determine a recommendation score, the recommendation score being indicative of whether the supplemental content should be displayed via the browser application, the determination being done based on at least the browser application state.

Step 508 includes executing, by the server 116, the MLA constructed as described herein above to determine a recommendation score associated with the supplemental content provided by the content recommendation server 118 at step 506 above.

The recommendation score is indicative of whether the supplemental content should be displayed via the browser application 104, and indicative of a probability or confidence level that the content would be of interest to the user if presented to the user.

The MLA uses at least the browser application state 146, and in this embodiment also the features determined at step 504 above, as input and provides the recommendation score as output.

Step 510—based on the recommendation score, selectively executing sending by the server to the browser application at least one data packet configured to cause the browser application to display the recommendation block containing the supplemental content on the display of the electronic device.

Step 510 of the method 500 includes, based on the recommendation score determined at step 508, selectively executing sending by the server 116 to the browser application 104 at least one data packet 122 configured to cause the browser application 104 to display the recommendation block 124 containing the supplemental content 130 on the display 103 of the electronic device 102.

More particularly, in accordance with the non-limiting embodiments of the present technology, the recommendation score determined at step 508 includes a confidence level parameter determined by the MLA based on the plurality of features determined at step 504. As noted above, the confidence level parameter is indicative of a probability that the supplemental content 130 would be of interest to the user if presented to the user. The server 116 determines whether the probability indicated by the confidence level parameter is above a pre-defined probability threshold, and sends the at least one data packet 122 to the browser application 104 only if the probability meets or exceeds the pre-defined probability threshold.

As an example, let's say the probability threshold is pre-defined to be 10% (it could have another value depending on the particular application of the method 500 for example). Then, if the MLA provides a confidence level parameter that indicates a probability of 10% or less, the server 116 does not send the at least one data packet 122 to the browser application 104 and therefore the browser application 104 does not display the recommendation block 124 containing the supplemental content 130 on the display 103 of the user's electronic device 102. For example, if at the point in time when the user is viewing the end portion 127 of the web page 126 the MLA returns a confidence level parameter that indicates a probability of 9%, the browser application 104 does not receive a lookup table 132 from the server 116.

In such a case, the browser application 104 simply renders the end portion 127 of the web page 126 without the recommendation block 124 as shown in FIG. 2. The user is then be able to continue browsing the web resource 145, or other web resources, until the user reaches another trigger point at which the server 116 is configured to selectively provide supplemental content and at which the MLA would return another confidence level parameter indicating a probability of more than 10%. At such other time, the user would be presented with the recommendation block 124 containing supplemental content relevant to whatever portion of whatever web resource the user would be viewing at that given point in time.

On the other hand, if at the point in time when the user is viewing the end portion 127 of the web page 126 the MLA returns a confidence level parameter that indicates a probability of more than 10%, the server 116 then does select a corresponding lookup table 132 and send it the at least one data packet 122 to the browser application 104. In such a case, the browser application 104 the browser application 104 does display the recommendation block 124 containing the supplemental content 130 on the display 103 of the user's electronic device 102 as shown in FIG. 3 according to the next state 134 dictated by the selected lookup table 132.

More particularly, in cases where the browser application 104 receives a selected lookup table 132, the browser application 104 inputs into the selected lookup table 132 as input both (i) the indication of the user action that had been pre-determined to cause the selective displaying of the recommendation block 124 and (ii) an indication of the state in which the recommendation block 124 is at the time of the user action (i.e. the current state of the recommendation block 124). As noted above, the recommendation block 124 could be in a virtual state in which the recommendation block 124 is invisible on the display 103 and a visual state in which the recommendation block 124 is visible on the display 103.

In response to the above input, the browser application 104 receives from the given lookup table 132 as output an indication of the next state (either visual or virtual) of the recommendation block 124. The browser application 104 then displays the recommendation block 124 containing the supplemental content 130 on the display 103 in the outputted next state of the recommendation block 124.

As described above, for each instance when the server 116 sends the at least one data packet 122 to the browser application 104, the server 116 is configured to first select a lookup table 132 out of the plurality of different lookup tables 132 accessible by the server 116 and include the selected one of the lookup tables 132 in the at least one data packet 122. Also as described above, each lookup table 132 dictates to the browser application 104 a particular next state (either a visual state or a virtual state) in which to display the recommendation block 124.

Further in accordance with the non-limiting embodiments of the present technology, the next state of the recommendation block 124 dictated by a given lookup table 132 is commensurate with the confidence level range that the given lookup table 132 corresponds to. The higher the confidence level, the more prominent the display of the recommendation block 124. To this end, and referring back to FIG. 1, the plurality of different lookup tables 132 includes at least: a first lookup table 133 corresponding to a first confidence level of the plurality of different confidence level ranges, and a second lookup table 135 corresponding to a second confidence level of the plurality of different confidence level ranges, the second confidence level being higher than the first confidence level.

The first and second lookup tables 133, 135 are pre-constructed (for example by a system administrator) such that the recommendation block 124 is more prominent when displayed on the display 103 in a next state of the recommendation block 124 determined by the second lookup table 135 based on a given combination of the current state of the recommendation block 124 and the user action, compared to being displayed on the display 103 in a next state of the recommendation block 124 determined by the first lookup table 133 based on the same given combination of the current state of the recommendation block 124 and the user action. In other words, for a given combination of a current state and a user action, second lookup table 135 would output a more prominent next state of the recommendation block 124 than the first lookup table 133. This is just an example however. It is contemplated that any suitable lookup tables 132 configuration could be used, depending on each particular application of the server 116 and/or the method 500.

Continuing with the example of FIGS. 2 to 4, the next state of the recommendation block 124 becomes a current state of the recommendation block 124 for a subsequent user action at which the recommendation block 124 is to be selectively displayed. To this end, the method 500 may further include, after the sending by the server 116 to the browser application 104 the at least one data packet 122, receiving at the server 116 an indication of the user having viewed the supplemental content 130 via the recommendation block 124. In response to the receiving this indication, the server 116 may change the current state of the recommendation block 124 to a virtual state.

The current state of the recommendation block 124 will then be an input into a subsequently selected lookup table 132 which will be sent to the browser application 104 in response to the server 116 subsequently again receiving the same user action and the same display state of the browser application 104. In some such cases, the lookup table 132 that will be selected by the server 116 will cause the browser application 104 to display the recommendation block 124 in a virtual (i.e. invisible) state on the display 103. In some cases, this avoids presenting the recommendation block 124 again in the same spot on a given web page 126 after the user has already been presented with the recommendation block 124 and appreciated the supplemental content 130 contained therein. It is contemplated that this further method step could be omitted.

Figure 6:
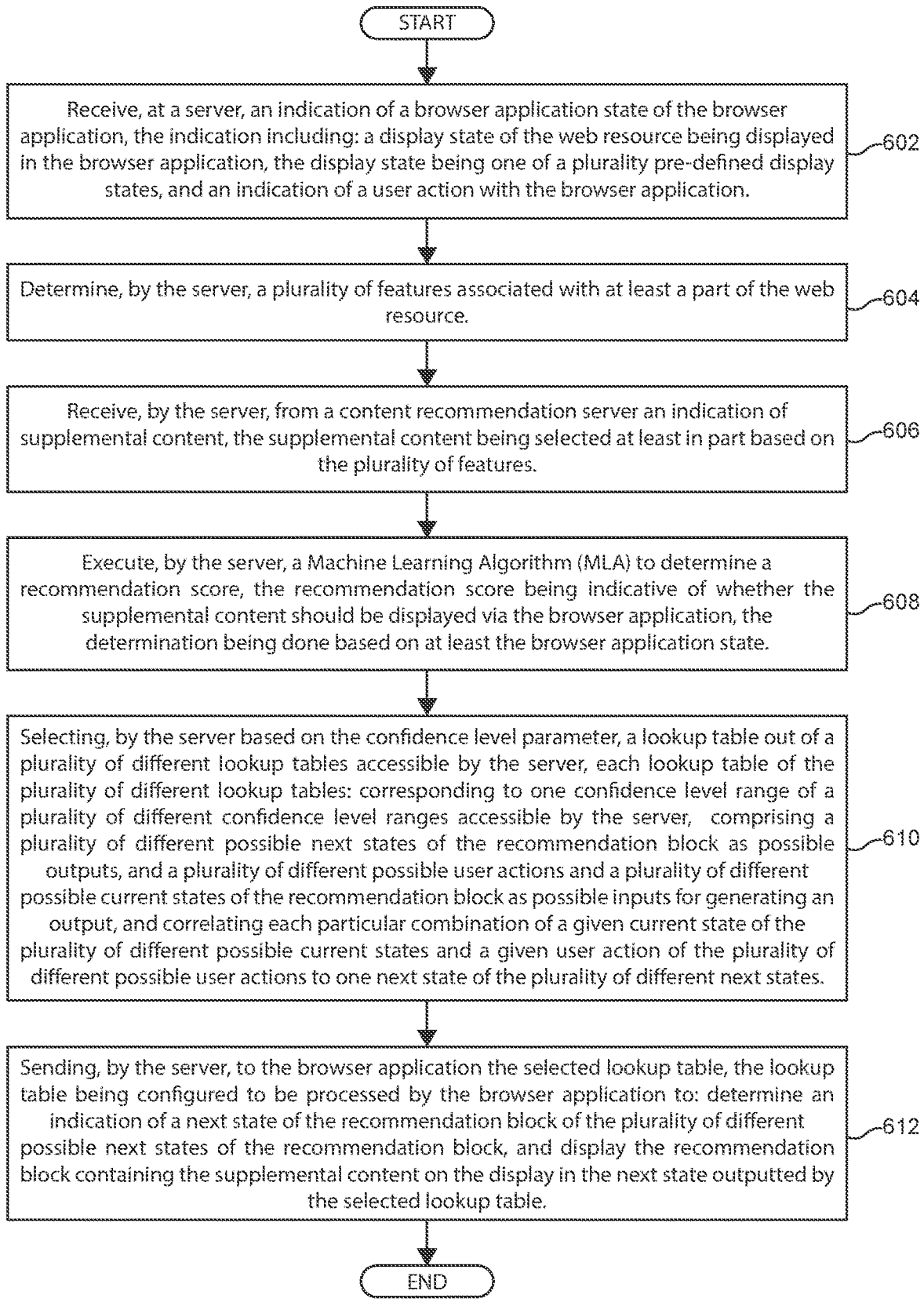
FIG. 6 shows a logic flow diagram depicting another non-limiting implementation of a method according to the present technology.

In some cases, and now referring to FIG. 6, an alternative method 600 could be performed to selectively present the user with the recommendation block 124 at various instances during the user's browsing activities via the browser application 104. The method 600 is implemented with the particular configuration of the server 116 described above in which the lookup tables 132 accessible by the server 116 provide at least some different next states of the recommendation block 124 in response to at least some different user actions and at a given state of the browser application 104.

Steps 602-608 of method 600.

Steps 602-608 of the method 600 are similar to the steps 502-508 of the method 500 and are therefore not described herein again. These steps are shown in FIG. 6.

Step 610—selecting, by the server based on the confidence level parameter, a lookup table out of a plurality of different lookup tables accessible by the server, each lookup table of the plurality of different lookup tables: corresponding to one confidence level range of a plurality of different confidence level ranges accessible by the server, comprising a plurality of different possible next states of the recommendation block as possible outputs, and a plurality of different possible user actions and a plurality of different possible current states of the recommendation block as possible inputs for generating an output, and correlating each particular combination of a given current state of the plurality of different possible current states and a given user action of the plurality of different possible user actions to one next state of the plurality of different next states.

Step 610 includes selecting, by the server 116 based on the confidence level parameter determined at Step 608, a lookup table 132 out of a plurality of different lookup tables 132 accessible by the server 116, each lookup table 132 of the plurality of different lookup tables 132 corresponding to one confidence level range of a plurality of different confidence level ranges accessible by the server 116. This sub-step is similar to the selection of a lookup table 132 step of the method 500, and therefore will not be described in more detail.

On the other hand, in this embodiment, each lookup table 132 of the plurality of different lookup tables 132 comprises a plurality of different possible next states of the recommendation block 124 as possible outputs. Each lookup table 132 further comprises a plurality of different possible user actions and a plurality of different possible current states of the recommendation block 124 as possible inputs for generating an output of a next state of the recommendation block 124.

Each lookup table 132 of the plurality of different lookup tables 132 correlates each particular combination of: a) a given current state of the plurality of different possible current states of the recommendation block 124 and b) a given user action of the plurality of different possible user actions, to one next state of the plurality of different next states of the recommendation block 124.

In other words, in this embodiment, a given lookup table 132 may provide a given next state of the recommendation block 124 for a current state of the recommendation block 124 and a user action, and a different next state of the recommendation block 124 for the same given current state of the recommendation block 124 but a different user action. An example application of this configuration is described below, after step 612 of the method 600.

Step 612—sending, by the server, to the browser application the selected lookup table, the lookup table being configured to be processed by the browser application to: determine an indication of a next state of the recommendation block of the plurality of different possible next states of the recommendation block, and display the recommendation block containing the supplemental content on the display in the next state outputted by the selected lookup table.

Once a lookup table 132 is selected at step 610, the method 600 proceeds by sending, by the server 116, to the browser application 104 the selected lookup table 132.

In this embodiment, the selected lookup table 132 is configured to be processed by the browser application 104 to: determine an indication of a next state of the recommendation block 124 of the plurality of different possible next states of the recommendation block 124, and display the recommendation block 124 containing the supplemental content 130 on the display 103 in the next state outputted by the selected lookup table 132.

Figure 7:
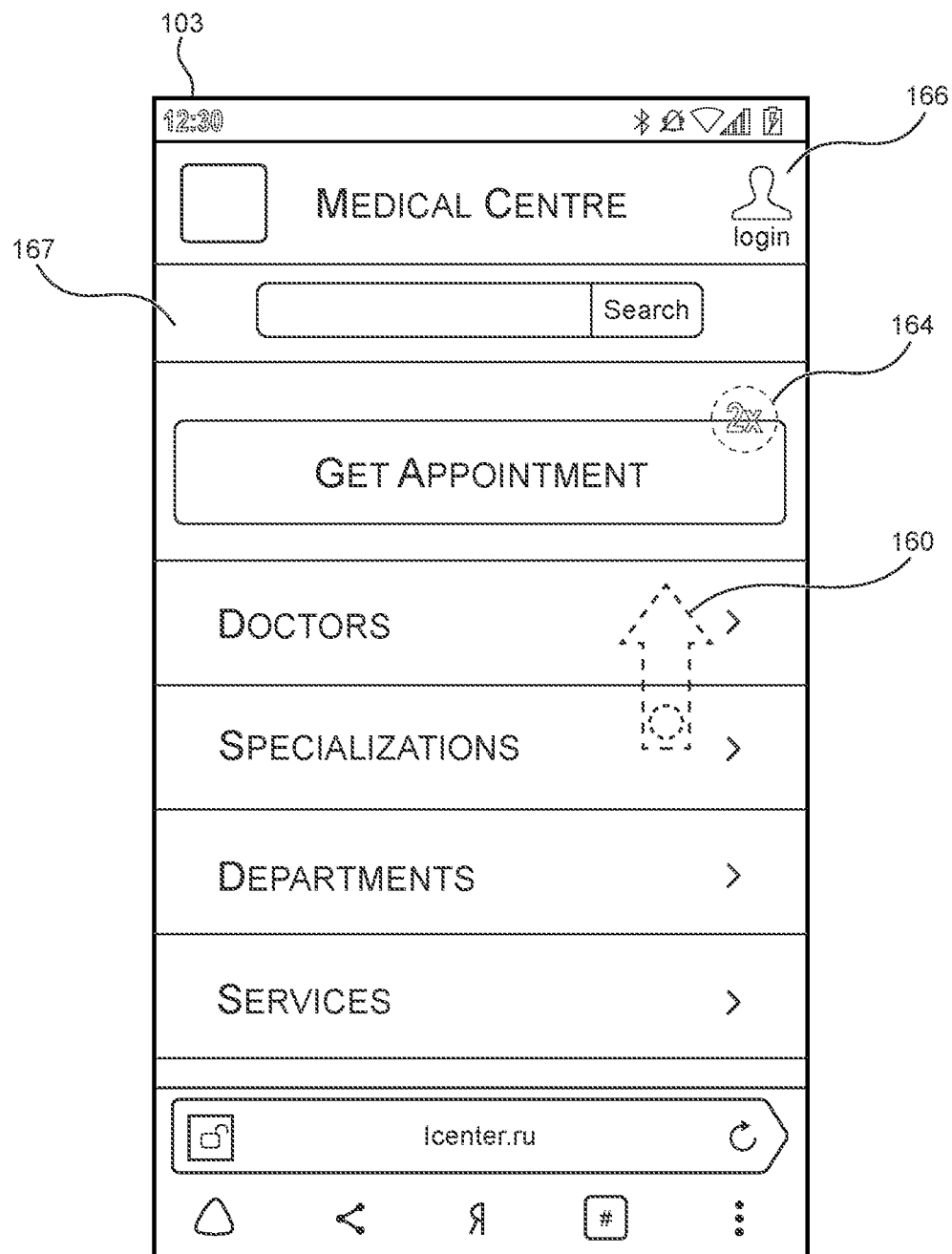
FIG. 7 depicts the electronic device of FIG. 2, the device displaying a web page of another web resource, the other web resource and the web page being in a given display state, the given display state including a display of a recommendation block in a virtual state thereof.
Figure 8:
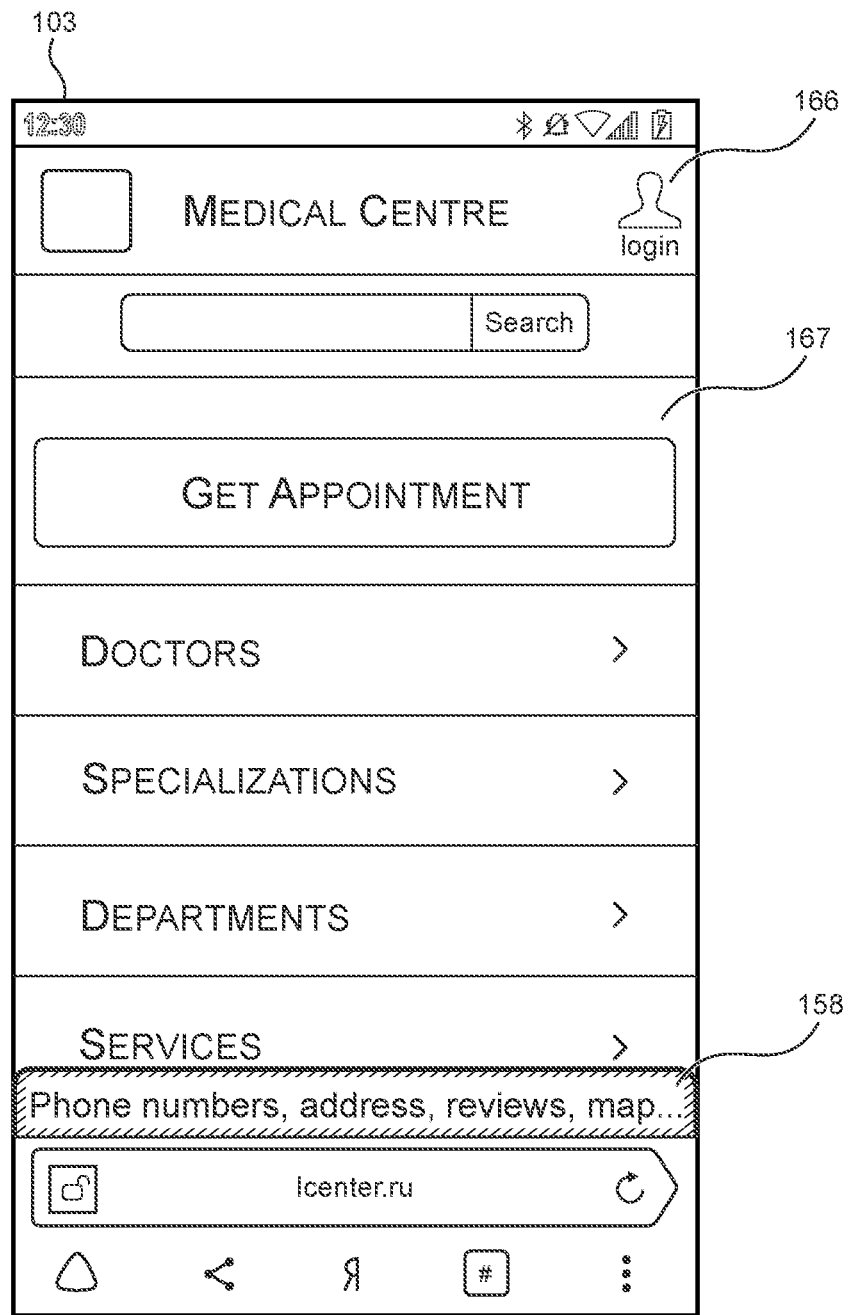
FIG. 8 depicts the electronic device of FIG. 2, the device displaying the web page of the other web resource, the other web resource and the web page being in another given display state, the other given display state including a display of the recommendation block in a visual snippet state thereof.
Figure 9:
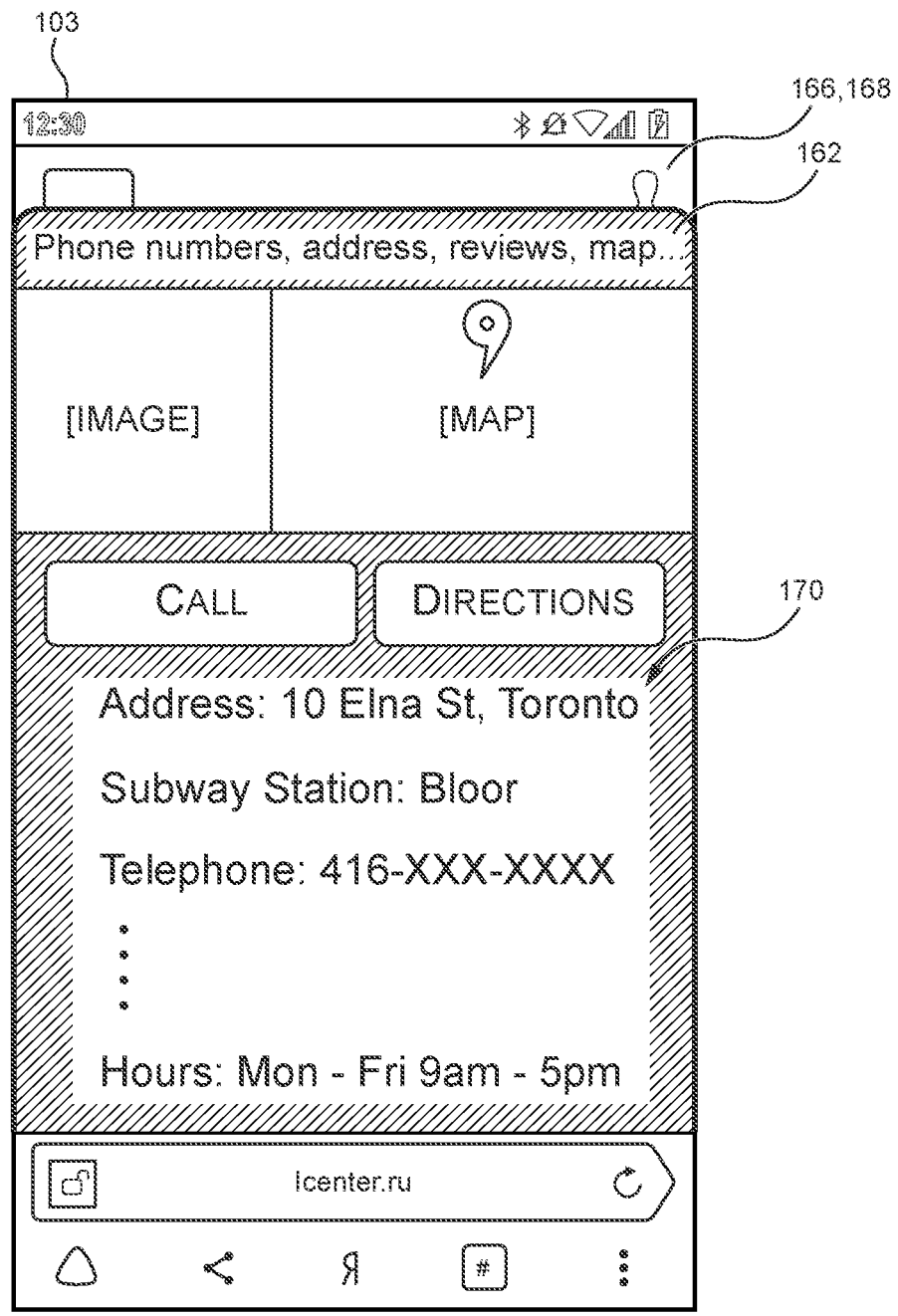
FIG. 9 depicts the electronic device of FIG. 2, the device displaying the web page of the other web resource, the other web resource and the web page being in yet another given display state, the yet other given display state including a display of the recommendation block in a visual expanded state thereof.

To give an example of an application of steps 610 and 612 above, reference is now made to FIGS. 7 to 9.

In this particular non-limiting example configuration, the user is provided with a snippet state 158 (FIG. 8) of the recommendation block 124 in response to an upward swipe user action shown with arrow 160 on FIG. 7 in cases where the confidence level in the supplemental content is above a pre-determined threshold probability of 40%.

Further in this non-limiting example configuration, the user is provided with a relatively larger size of a recommendation block 162 in response to a double-tap user action, shown with a dashed circle 164 in FIG. 7, in cases where the confidence level in the supplemental content is above the pre-determined threshold probability of 40%.

Yet further in this non-limiting example configuration, the lookup tables 132 are constructed (for example, by a system administrator or by one or more human assessors) to scale the size of the recommendation block 124 as a function of the confidence level indicated by the confidence level parameter determined by the MLA when the recommendation block 124 is displayed in response to the double-tap user action.

More particularly, as shown in FIG. 7, the user has accessed a web resource 166 pertaining to a medical centre, and is viewing a web page 167 of the web resource 166 while the recommendation block 124 is in a virtual (invisible) state.

At the point in time shown in FIG. 7, the display state of the web resource 166 is such that a top portion of the web page 167 is being shown. Also at the point in time shown in FIG. 7, steps 602 to 608 of the method 600 have been executed and have resulted in the MLA providing a confidence level parameter indicating a confidence level of, for the sake of an example, 90% in supplemental content 170 (shown in FIG. 9) provided by the content recommendation server 118 for potential presentation on the user's electronic device 102.

At this point in time, the server 116 has also selected one of the lookup tables 132 that corresponds to the 90% confidence level and has sent the selected one of the lookup tables 132 to the browser application 104 for processing.

For the sake of an example, the selected one of the lookup tables 132 correlates a snippet state as the next state of the recommendation block 124 for each possible current state of the recommendation block 124 that is accompanied by the upward swipe user action 160. The selected one of the lookup tables 132 further correlates different expanded visual states of the recommendation block 124 as the next state of the recommendation block 124 for at least some current states of the recommendation block 124 that are accompanied by a double-tap user action 164.

Now, from the point in time shown in FIG. 7, the browser application 104 inputs into the received lookup table 132 the user action and the current virtual state of the recommendation block 124 as input, and receives a next state of the recommendation block 124 as output. In cases where the browser application 104 receives an indication of an upward swipe user action 160, the browser application 104 inputs an indication of the upward swipe user action 160 and the current virtual state of the recommendation block 124 as input into the received lookup table 132 and according to the non-limiting example construction of the lookup table 132 described above, receives the snippet state 158 of the recommendation block 124 as the next state in which to display the recommendation block 124. Accordingly, as shown in FIG. 8, in such a case the browser application 104 displays the recommendation block 124 in the snippet state 158.

On the other hand, from the point in time shown in FIG. 7, where the browser application 104 receives an indication of a double-tap 164 executed by the user, the browser application 104 inputs an indication of the double-tap 164 and the current virtual state of the recommendation block 124 as input into the received lookup table 132 and according to the non-limiting example construction of the lookup table 132 described above, receives a visual state 168 of the recommendation block 124 as the next state in which to display the recommendation block 124. Accordingly, as shown in FIG. 9, in such a case the browser application 104 displays the recommendation block 124 in the visual state 168.

Notably, as can be seen in FIG. 9, the visual state 168 of the recommendation block 124 is relatively prominent in that the recommendation block 124 occupies most of the display 103 of the user's electronic device 102. This is due to the lookup table 132 having been selected by the server 116 based on the 90% confidence level. If the MLA-determined confidence level had been, for example, 55%, the server 116 would have selected a different corresponding lookup table 132. That lookup table 132 would have provided a relatively less prominent visual display state of the recommendation block 124 based on the same input of the indication of the double-tap 164 and the current virtual state of the recommendation block 124 by the browser application 104. In such a case, the outputted visual state could have caused the browser application 104 to display the recommendation block 124 at, for example, only 60% of the size of the recommendation block 124 shown in FIG. 9.

Understandably, the particular states and sizes of the recommendation block 124 that are assigned to the various possible confidence levels could be configured differently (for example by an administrator of the server 116) for each given application of the method 600 and/or the user's electronic device 102 and/or based on any other relevant factors.

Modifications and improvements to the above-described implementations of the present technology may become apparent to those skilled in the art. The foregoing description is intended to be exemplary rather than limiting.

While particular orders of methods steps have been set out herein above, it is contemplated that other orders of method steps and/or additional and/or alternative method steps could be used to carry out the methods described herein.

Modifications and improvements to the above-described implementations of the present technology may become apparent to those skilled in the art. The foregoing description is intended to provide specific non-limiting implementations of the present technology.

The invention claimed is:

1. A method of selectively presenting a recommendation block to a user accessing a web resource in a browser application being displayed on a display of an electronic device, the method executable at a server connectable to the electronic device via a communication network, the method comprising:
   receiving, at a server, an indication of a browser application state of the browser application, the indication including:
      a display state of the web resource being displayed in the browser application, the display state being one of a plurality pre-defined display states and indicative of the recommendation block being in a current state being indicative of how the recommendation block having previous content is being displayed together with the web resource, and
      an indication of a user action with the browser application;
   determining, by the server, a plurality of features associated with at least a part of the web resource;
   receiving, by the server, from a content recommendation server an indication of supplemental content, the supplemental content having been selected at least in part based on the plurality of features;
   executing, by the server, a Machine Learning Algorithm (MLA) to determine a recommendation score, the recommendation score being indicative of whether the supplemental content should be displayed via the browser application, the determination being done based on at least the browser application state;
   based on the recommendation score, selectively executing sending by the server to the browser application at least one data packet configured to cause the browser application to display the recommendation block containing the supplemental content on the display of the electronic device; and
   transmitting to the browser application a presentation selection algorithm configured to be processed by the browser application in response to receiving the at least one data packet by:
      the browser application inputting into the presentation selection algorithm as input both (i) the indication of the user action and (ii) an indication of the current state of the recommendation block;
      the browser application receiving from the presentation selection algorithm as output based on the indication of the user action and the indication of the current state, an indication of a next state of the recommendation block, and
      the browser application displaying the recommendation block containing the supplemental content on the display in the next state of the recommendation block.

2. The method of claim 1, wherein the plurality of features includes data representative of a plurality of prior user actions by which the user had interacted with the web resource via the browser application, at least some of the plurality of prior user actions having caused recommendation blocks to be displayed via the browser application.

3. The method of claim 1, wherein the plurality of features includes a plurality of features of the web resource.

4. The method of claim 1, wherein:
the recommendation score includes a confidence level parameter determined by the MLA based on the plurality of features, the confidence level parameter being indicative of a probability that the supplemental content would be of interest to the user if presented to the user; and
the selectively executing the sending the at least one data packet to the browser application includes determining, by the server, whether the probability exceeds a pre-defined probability threshold, and sending the at least one data packet to the browser application if the probability exceeds the pre-defined probability threshold.

5. The method of claim 1, wherein the MLA had been trained based on user interactions with training recommendation blocks and based on features associated with training web resources that were accessed by users to be presented with respective ones of the training recommendation blocks.

6. The method of claim 1, wherein the user action is at least any one of: a back scroll, a scrolling action, a gesture inputted into a touch sensitive input device, an actuation of at least one key of a keyboard, and an actuation of at least one button of a mouse, a scrolling action reaching an end of a displayed page of the web resource.

7. The method of claim 1, wherein:
the presentation selection algorithm is a lookup table that comprises a plurality of different possible next states of the recommendation block as possible outputs, and the user action and a plurality of different possible current states of the recommendation block as possible inputs for providing the possible outputs;
the lookup table correlates each of the plurality of different next states of the recommendation block to one particular combination of a given current state of the plurality of different possible current states and the user action; and
the lookup table is configured to output the next state of the recommendation block from the plurality of different possible next states of the recommendation block as output in response to the current state of the recommendation block and the user action being inputted into the lookup table as input.

8. The method of claim 7, wherein:
the lookup table comprises a plurality of different possible user actions as part of the possible inputs, the user action being one of the different possible user actions; and
the lookup table correlates each particular combination of: i) the given current state of the plurality of different possible current states of the recommendation block, and ii) a given user action of the plurality of different possible user actions to one next state of the plurality of different next states of the recommendation block.

9. The method of claim 7, wherein:
the recommendation score includes a confidence level parameter indicating a confidence level that the supplemental content would be of interest to the user if presented to the user;
the sending to the browser application the lookup table includes selecting, by the server, the lookup table out of a plurality of different lookup tables accessible by the server;

each lookup table of the plurality of different lookup tables:
corresponds to one confidence level range of a plurality of different confidence level ranges accessible by the server, and
determines a particular next state of the recommendation block based on a given combination of the current state of the recommendation block and the user action, the particular next state of the recommendation block being different from the next state of the recommendation block determined by at least one of the rest of the plurality of different lookup tables based on the same given combination of the current state of the recommendation block and the user action; and
the selecting, by the server, the lookup table out of the plurality of different lookup tables includes:
determining a correspondence between the confidence level indicated by the confidence level parameter and a matching one of the plurality of different confidence level ranges, and
selecting the lookup table to be the one of the plurality of different lookup tables that corresponds to the matching one of the plurality of different confidence level ranges.

10. The method of claim 9, wherein:
the supplemental content is associated with at least one type of content; and
the lookup table is selected by the server out of the plurality of different lookup tables further based on the at least one type of content.

11. The method of claim 9, wherein:
the plurality of different lookup tables are sent to the browser application prior to the server sending the at least one data packet to the browser application; and
the at least one data packet is configured to cause the browser to process the lookup table to determine the next state of the recommendation block based on the indication of the user action and the indication of the current state and to display the recommendation block on the display in the next state of the recommendation block.

12. The method of claim 9, wherein the sending the at least one data packet includes sending by the server the selected lookup table to the browser application.

13. The method of claim 9, wherein:
each lookup table of the plurality of lookup tables comprises a plurality of different possible user actions, the user action being one of the different possible user actions; and
each lookup table of the plurality of lookup tables correlates each particular combination of: i) the given current state of the plurality of different possible current states of the recommendation block, and ii) a given user action of the plurality of different possible user actions, to one next state of the plurality of different next states of the recommendation block.

14. The method of claim 13, wherein each confidence level of the plurality of different confidence level ranges is a range of confidence levels that the supplemental content would be of interest to the user.

15. The method of claim 14, wherein:
the plurality of different lookup tables includes:
a first lookup table corresponding to a first confidence level of the plurality of different confidence level ranges, and a second lookup table corresponding to a second confidence level of the plurality of different confidence level ranges, the second confidence level being higher than the first confidence level; and the recommendation block is more prominent:
when displayed on the display in the particular next state of the recommendation block determined by the second lookup table based on the given combination of the current state of the recommendation block and the user action, when compared to being displayed on the display in the particular next state of the recommendation block determined by the first lookup table based on the same given combination of the current state of the recommendation block and the user action.

16. The method claim 15, wherein the plurality of different possible current states of the recommendation block comprises a visual state of the recommendation block and a virtual state of the recommendation block, the virtual state being defined such that the recommendation block is invisible on the display when displayed by the browser application in any virtual state of the at least one virtual state.

17. The method claim 16, further comprising:
after the sending by the server to the browser application the at least one data packet, receiving at the server an indication of the user having viewed the supplemental content via the recommendation block; and
in response to the receiving the indication of the user having viewed the supplemental content, assigning a given virtual state to the recommendation block as the current state of the recommendation block; and
wherein the plurality of different possible current states of each lookup table of the plurality of different lookup tables includes the given virtual state of the recommendation block.

18. The method claim 17, wherein the plurality of different possible next states of the recommendation block comprises at least one visual state of the recommendation block and at least one virtual state of the recommendation block.

19. A server for selectively presenting a recommendation block to a user accessing a web resource in a browser application being displayed on a display of an electronic device, the server being communicatively connectable to the electronic device and comprising:
a processor; and
a non-transient memory communicatively connected to the processor, the non-transient memory storing instructions that when executed by the processor, cause the server to:

receive an indication of a browser application state of the browser application, the indication including:
a display state of the web resource being displayed in the browser application, the display state being one of a plurality pre-defined display states and indicative of the recommendation block being in a current state being indicative of how the recommendation block having previous content is being displayed together with the web resource, and
an indication of a user action with the browser application;

determine a plurality of features associated with at least the part of the web resource;

receive from a content recommendation server an indication of supplemental content;

execute a Machine Learning Algorithm (MLA) to determine a recommendation score, the recommendation score being indicative of whether the supplemental content should be displayed via the browser application, the determination being done based on at least the browser application state;

where the recommendation score exceeds a pre-defined metric, send to the browser application at least one data packet configured to cause the browser application to display the recommendation block containing the supplemental content on the display in response to the user action; and transmit to the browser application a presentation selection algorithm configured to be processed by the browser application in response to receiving the at least one data packet by:
the browser application inputting into the presentation selection algorithm as input both (i) the indication of the user action and (ii) an indication of the current state of the recommendation block;
the browser application receiving from the presentation selection algorithm as output based on the indication of the user action and the indication of the current state, an indication of a next state of the recommendation block, and
the browser application displaying the recommendation block containing the supplemental content on the display in the next state of the recommendation block.

* * * * *